US012499560B2

(12) United States Patent
Psota et al.

(10) Patent No.: US 12,499,560 B2
(45) Date of Patent: Dec. 16, 2025

(54) MATERIALS AND METHODS FOR LONG-TERM TRACKING OF GROUP-HOUSED LIVESTOCK

(71) Applicant: NUtech Ventures, Lincoln, NE (US)

(72) Inventors: Eric T. Psota, Lincoln, NE (US); Lance C. Perez, Lincoln, NE (US); Ty Schmidt, Eagle, NE (US); Benny Mote, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 308 days.

(21) Appl. No.: 18/001,965

(22) PCT Filed: Jun. 17, 2021

(86) PCT No.: PCT/US2021/037967
§ 371 (c)(1),
(2) Date: Dec. 15, 2022

(87) PCT Pub. No.: WO2021/257925
PCT Pub. Date: Dec. 23, 2021

(65) Prior Publication Data

US 2023/0230258 A1 Jul. 20, 2023

Related U.S. Application Data

(60) Provisional application No. 63/040,951, filed on Jun. 18, 2020.

(51) Int. Cl.
*G06T 7/246* (2017.01)
*A01K 11/00* (2006.01)
(Continued)

(52) U.S. Cl.
CPC ............ *G06T 7/246* (2017.01); *A01K 11/006* (2013.01); *G06T 7/73* (2017.01); *G06V 10/764* (2022.01);
(Continued)

(58) Field of Classification Search
None
See application file for complete search history.

(56) References Cited

U.S. PATENT DOCUMENTS 8,391,548 B1 * 3/2013 Medioni ................ G06V 20/52
382/103
10,762,644 B1 * 9/2020 Mahadevan ............ G06T 7/251
(Continued)

OTHER PUBLICATIONS

An Algorithm for Multiple Object Trajectory Tracking. Han et al. (Year: 2004).*

(Continued)

*Primary Examiner* — Delomia L Gilliard
(74) *Attorney, Agent, or Firm* — Fish & Richardson P.C.

(57) ABSTRACT

The invention relates to a computer-implemented method of tracking animals is provided. Such a method typically includes recognizing, by using at least one data processor, individual animals in images of a plurality of the animals; and tracking the animals using a probabilistic tracking-by-detection process. In another aspect, a system for recognizing animals is provided. Such a system typically includes an instance detection and part localization module; a visual marker classification module; a fixed-cardinality track interpolation module; and a maximum a posteriori estimation of animal identity module.

16 Claims, 10 Drawing Sheets

Visual Marker Classification
$\{p(I^1|x^1_{1:N^1} \rightarrow \{1,\ldots,N\})\}$
$\{p(I^T|x^t_{1:N^T} \rightarrow \{1,\ldots,N\})\}$
$I^1$ ... $I^T$
$\{I^1_{1:N^1_t}, r^1_{1:N^1_r}\}$ ... $\{I^T_{1:N^T_t}, r^T_{1:N^T_r}\}$
$\{x^1_{1:N^1}\}$ ... $\{x^T_{1:N^T}\}$
MAP Estimation of Animal Identity
$\{x^1_{1:N}\}$ ... $\{x^T_{1:N}\}$
Video Frame Sequence
Instance Detection and Part Localization
Fixed-Cardinality Track Interpolation
$\{x^1_{1:N}\}$ ... $\{x^T_{1:N}\}$

(51) Int. Cl.

| | |
|---|---|
| ***G06T 7/73*** | (2017.01) |
| ***G06V 10/764*** | (2022.01) |
| ***G06V 10/82*** | (2022.01) |
| ***G06V 20/40*** | (2022.01) |
| ***G06V 40/10*** | (2022.01) |

(52) U.S. Cl.

CPC .............. *G06V 10/82* (2022.01); *G06V 20/40* (2022.01); *G06V 40/10* (2022.01); *G06T 2207/10016* (2013.01); *G06T 2207/20076* (2013.01); *G06T 2207/20084* (2013.01); *G06T 2207/30204* (2013.01)

(56) References Cited

U.S. PATENT DOCUMENTS

| | | | | |
|---|---|---|---|---|
| 2003/0058340 | A1* | 3/2003 | Lin | G06F 18/295 348/E7.086 |
| 2006/0215880 | A1* | 9/2006 | Berthilsson | G06V 20/52 382/103 |
| 2008/0059885 | A1* | 3/2008 | Loui | G06F 16/785 707/E17.028 |
| 2011/0135166 | A1* | 6/2011 | Wechsler | G06V 40/172 382/118 |
| 2016/0026895 | A1 | 1/2016 | Huffman et al. | |
| 2018/0228129 | A1* | 8/2018 | Yajima | G06V 10/95 |
| 2019/0096066 | A1* | 3/2019 | Chen | G06T 7/11 |
| 2019/0138801 | A1* | 5/2019 | Psota | G06T 7/73 |
| 2020/0120899 | A1 | 4/2020 | Labrecque et al. | |
| 2020/0226360 | A1 | 7/2020 | Bouchard et al. | |
| 2021/0134387 | A1* | 5/2021 | McMaster-Schraiber | G06N 3/045 |
| 2023/0230258 | A1* | 7/2023 | Psota | G06T 7/73 382/103 |

OTHER PUBLICATIONS

Multi-Pig Part Detection and Association with a Fully-Convolutional Network. Psota et al. (Year: 2018).*

Alvarenga et al., "Using a three-axis accelerometer to identify and classify sheep behaviour at pasture," Appl. Anim. Behav. Sci., Aug. 2016, 181:91-99.

Andriluka et al., "Paper: 2d human pose estimation: New benchmark and state of the art analysis," Paper, Presented at Proceedings of the IEEE Conference on Computer Vision and Pattern Recognition, Columbus, OH, USA, Jun. 24-27, 2014, 8 pages.

Ardö et al., "Convolutional neural network-based cow interaction watchdog," IET Comput. Vision, 2017, 12(2):171-177.

Banhazi et al., "Precision livestock farming: An international review of scientific and commercial aspects," Int. J. Agric. Biol. Eng., Jan. 2012, 5(3):1-9.

Bochinski et al., "Paper: High-speed tracking-by-detection without using image information," Paper, Presented at Proceedings of the 2017 14th IEEE International Conference on Advanced Video and Signal Based Surveillance (AVSS), Lecce, Italy, Aug. 29-Sep. 1, 2017, 6 pages.

Burgunder et al., "Fractal measures in activity patterns: Do gastrointestinal parasites affect the complexity of sheep behaviour?," Appl. Anim. Behav. Sci., Aug. 2018, 205:44-53.

Cao et al., "Paper: Realtime Multi-Person 2D Pose Estimation using Part Affinity Fields," Paper, Presented at Proceedings of the IEEE Conference on Computer Vision and Pattern Recognition, Honolulu, HI, Jul. 21-26, 2017, pp. 7291-7299, 9 pages.

Chen et al., "Markov Approximation for Combinatorial Network Optimization," IEEE Trans. Inf Theory, 2013, 59:6301-6327, 17 pages.

Chen et al., "Paper: Encoder-decoder with atrous separable convolution for semantic image segmentation," Paper, Presented at Proceedings of the European conference on computer vision (ECCV), Munich, Germany, Sep. 8-14, 2018, 18 pages.

Choi et al., "Individual Pig Detection Using Kinect Depth Information," KIPS Trans. Comput. Commun. Syst., 2016, 5(10):319-326 (with English abstract).

Clark et al., "An advanced, low-cost, GPS-based animal tracking system," Rangeland Ecol. Manag., May 2006, 59(3):334-340.

Cordts et al., "Paper: The cityscapes dataset for semantic urban scene understanding," Paper, Presented at Proceedings of the IEEE Conference on Computer Vision and Pattern Recognition, Las Vegas, NV, Jun. 26-Jul. 1, 2016, 29 pages.

Dehghan et al., "Paper: GMMCP Tracker: Globally optimal generalized maximum multi clique problem for multiple object tracking," Paper, Presented at Proceedings of the IEEE Conference on Computer Vision and Pattern Recognition, Boston, MA, Jun. 7-12, 2016, pp. 4091-4099, 9 pages.

Deng et al., "Paper: ImageNet: A large-scale hierarchical image database," Paper, Presented at Proceedings of the 2009 IEEE conference on computer vision and pattern recognition, Miami Beach, FL, Jun. 25-29, 2009, pp. 248-255, 8 pages.

Escalante et al., "Sow-activity classification from acceleration patterns: A machine learning approach," Comput. Electron. Agric., Apr. 2013, 93:17-26.

Everingham et al., "The PASCAL visual object classes challenge: A retrospective," Int. J. Comput. Vision, 2015, 111:98-136, 39 pages.

Feng et al., "Development and evaluation on a RFID-based traceability system for cattle/beef quality safety in China," Food Control, Jun. 2013, 31(2):314-325.

Fernandes et al., "A novel automated system to acquire biometric and morphological measurements, and predict body weight of pigs via 3D computer vision," J. Anim. Sci., 2018, 97:496-508.

Floyd, "RFID in animal-tracking applications," IEEE Potentials, Sep. 2015, 34:32-33.

Giancola et al., "Paper: UWB MAC and network solutions for low data rate with location and tracking applications," Paper, Presented at Proceedings of the 2005 IEEE International Conference on Ultra-Wideband, Zurich, Switzerland, Sep. 5-8, 2005, pp. 758-763.

Girshick et al., "Paper: Rich feature hierarchies for accurate object detection and semantic segmentation," Paper, Presented at Proceedings of the IEEE conference on computer vision and pattern recognition, Columbus, OH, Jun. 24-27, 2014, 21 pages.

Hansen et al., "Towards on-farm pig face recognition using convolutional neural networks," Comput. Ind., Jun. 2018, 98:145-152.

He et al., "Paper: Deep residual learning for image recognition," Paper, Presented at Proceedings of the IEEE conference on computer vision and pattern recognition, Las Vegas, NV, Jun. 26-Jul. 1, 2016, pp. 770-778, 12 pages.

He et al., "Paper: Mask r-cnn," Paper, Presented At Proceedings of the 2017 IEEE International Conference on Computer Vision (ICCV), Venice, Italy, Oct. 22-29, 2017, 9 pages.

Huang et al., "Paper: Densely connected convolutional networks," Paper, Presented at Proceedings of the IEEE conference on computer vision and pattern recognition, Venice, Italy, Oct. 22-29, 2017, pp. 4700-4708.

International Preliminary Report on Patentability in International Appln. No. PCT/US2021/037967, mailed Dec. 29, 2022, 8 pages.

International Search Report and Written Opinion in International Appln. No. PCT/US2021/037967, mailed Sep. 22, 2021, 11 pages.

Iredale et al., "The influence of observer presence on baboon (*Papio* spp.) and rhesus macaque (*Macaca mulatta*) behavior," Appl. Anim. Behav. Sci., Jan. 2010, 122(1):53-57, 11 pages.

Jack et al., "The effects of observer presence on the behavior of Cebus capucinus in Costa Rica," Am. J. Primatol., May 2008, 70(5):490-494.

Jia et al., "Paper: Caffe: Convolutional architecture for fast feature embedding," Paper, Presented at Proceedings of the 22nd ACM international conference on Multimedia. ACM, Orlando, FL, Nov. 3-7, 2014, pp. 675-678, 4 pages.

Ju et al., "A Kinect-Based Segmentation of Touching-Pigs for Real-Time Monitoring," Sensors, May 2018, 18(6):1746, 24 pages.

Kashiha et al., "Automatic monitoring of pig locomotion using image analysis," Livest. Sci., Jan. 2014, 159:141-148, 19 pages.

Kim et al., "Depth-Based Detection of Standing-Pigs in Moving Noise Environments," Sensors, Nov. 2017, 17(12):2757, 19 pages.

(56) References Cited

OTHER PUBLICATIONS

Kim et al., "Paper: Animal situation tracking service using RFID, GPS, and sensors," Paper, Presented at Proceedings of the 2010 Second International Conference on Computer and Network Technology (ICCNT), Bangkok, Thailand, Apr. 23-25, 2010, pp. 153-156.
Kirk, "NVIDIA CUDA software and GPU parallel computing architecture," Paper, Presented at Proceedings of the ISMM, New York, NY, May 19-25, 2007, pp. 103-104, 65 pages.
Kongsro, "Estimation of pig weight using a Microsoft Kinect prototype imaging system," Comput. Electron. Agric., Nov. 2014, 109:32-35.
Krizhevsky et al., "Paper: ImageNet classification with deep convolutional neural networks," Paper, Presented at Proceedings of the Advances in neural information processing systems, Lake Tahoe, NV, Dec. 3-8, 2012, pp. 1097-1105; Communications of the ACM, 2017, 60(6):84-90.
Lao et al., "Automatic recognition of lactating sow behaviors through depth image processing," Comput. Electron. Agric., Jul. 2016, 125:56-62.
LeCun et al., "Gradient-based learning applied to document recognition," Proc. IEEE, 1998, 86:2278-2324.
Lee et al., "Automatic Recognition of Aggressive Behavior in Pigs Using a Kinect Depth Sensor," Sensors, May 2016, 16(5):631, 11 pages.
Leruste et al., "Effects of the observation method (direct v. from video) and of the presence of an observer on behavioural results in veal calves," Animal, Nov. 2013, 7(11):1858-1864.
Lin et al., "Paper: Microsoft COCO: Common objects in context," Paper, Presented at Proceedings of the European Conference on Computer Vision, New-York, NY, Sep. 6-12, 2014, pp. 740-755.
Liu et al., "Paper: Ssd: Single shot multi box detector," Paper, Presented at Proceedings of the European conference on computer vision, Amsterdam, The Netherlands, Oct. 11-14, 2016, pp. 21-37, 17 pages.
Matthews et al., "Automated tracking to measure behavioural changes in pigs for health and welfare monitoring," Sci. Rep., Dec. 2017, 7(1):17582, 12 pages.
Matthews et al., "Early detection of health and welfare compromises through automated detection of behavioural changes in pigs," Vet. J., Nov. 2016, 217:43-51.
Mayer et al., "Paper: Cattle health monitoring using wireless sensor networks," Paper, Presented at Proceedings of the Communication and Computer Networks Conference, Cambridge, MA, Nov. 8-10, 2004, 8 pages.
Milan et al., "MOT16: A benchmark for multi-object tracking," arXiv Preprint, 2016, arXiv:1603.00831, 12 pages.
Mittek et al., "Paper: Health Monitoring of Group-Housed Pigs using Depth-Enabled Multi-Object Tracking," Paper, Presented at Proceedings of the Visual observation and analysis of Vertebrate And Insect Behavior, Cancun, Mexico, Dec. 4, 2016, 4 pages.
Mittek et al., "Tracking of group-housed pigs using multi-ellipsoid expectation maximisation," IET Comput. Vision, Dec. 2017, 12(2):121-128.
Nasirahmadi et al., "Using machine vision for investigation of changes in pig group lying patterns," Comput. Electron. Agric., Nov. 2015, 119:184-190, 19 pages.
Neethirajan, "Recent advances in wearable sensors for animal health management," Sens. Bio-Sens. Res., Feb. 2017, 12:15-29.
Nilsson et al., "Paper: Learning based image segmentation of pigs in a pen," Paper, Presented at Proceedings of the Visual observation and analysis of Vertebrate And Insect Behavior—Workshop at the 22nd International Conference on Pattern Recognition (ICPR 2014), Stockholm, Sweden, Aug. 24, 2014, pp. 24-28, 4 pages.
Papandreou et al., "Paper: PersonLab: Person Pose Estimation and Instance Segmentation with a Bottom-Up, Part-Based, Geometric Embedding Model," Paper, Presented at Proceedings of the European Conference on Computer Vision, Munich, Germany, Sep. 8-14, 2018, pp. 269-286, 18 pages.
Pezzuolo et al., "On-barn pig weight estimation based on body measurements by a Kinect vl depth camera," Comput. Electron. Agric., May 2018, 148:29-36.
PIC North America, "Standard Animal Care: Daily Routines," Wean-to-Finish manual, PIC North America: Hendersonville, TN, USA, 2014, pp. 23-24.
Porto et al., "Localisation and identification performances of a real-time location system based on ultra wide band technology for monitoring and tracking dairy cow behaviour in a semi-open free-stall barn," Comput. Electron. Agric., Oct. 2014, 108:221-229.
Psota et al., "Long-Term Tracking of Group-Housed Livestock Using Keypoint Detection and MAP Estimation for Individual Animal Identification," Sensors, 2020, 20:3670, 23 pages.
Psota et al., "Multi-Pig Part Detection and Association with a Fully-Convolutional Network," Sensors, Feb. 2019, 19(4):852, 24 pages.
Redmon and Farhadi, "Paper: YOLO9000: Better, Faster, Stronger," Paper, Presented at Proceedings of the IEEE Conference on Computer Vision and Pattern Recognition, Honolulu, HI, Jul. 21-26, 2017, 9 pages.
Ristani and Tomasi, "Paper: Features for multi-target multi-camera tracking and re-identification," Paper, Presented at Proceedings of the IEEE Conference on Computer Vision and Pattern Recognition, Salt Lake City, UT, Jun. 18-22, 2018, 11 pages.
Ronneberger et al., "Paper: U-net: Convolutional networks for biomedical image segmentation," Paper, Presented at Proceedings of the International Conference on Medical image computing and computer-assisted intervention, Munich, Germany, Oct. 5-9, 2015, 8 pages.
Ruiz-Garcia et al., "A Review of Wireless Sensor Technologies and Applications in Agriculture and Food Industry: State of the Art and Current Trends," Sensors, 2009, 9(6):4728-4750.
Schleppe et al., "Challenges in the design of a GNSS ear tag for feedlot cattle," Comput. Electron. Agric., Jan. 2010, 70(1):84-95.
Schwager et al., "Robust classification of animal tracking data," Comput. Electron. Agric., Mar. 2007, 56(1):46-59.
Stavrakakis et al., "Validity of the Microsoft Kinect sensor for assessment of normal walking patterns in pigs," Comput. Electron. Agric., Sep. 2015, 117:1-7.
Tullo et al., "Paper: Precision livestock farming: An overview of image and sound labelling," Paper, Presented at Proceedings of the European Conference on Precision Livestock Farming 2013:(PLF) EC-PLF, KU Leuven, Belgium, Sep. 10-12, 2013, 8 pages.
Tuyttens et al., "Observer bias in animal behaviour research: Can we believe what we score, if we score what we believe?," Anim. Behav., Apr. 2014, 90:273-280.
Voulodimos et al., "A complete farm management system based on animal identification using RFID technology," Comput. Electron. Agric., Mar. 2010, 70(2):380-388.
Wathes et al., "Is precision livestock farming an engineer's daydream or nightmare, an animal's friend or foe, and a farmer's panacea or pitfall?," Comput. Electron. Agric., Nov. 2008, 64(1):2-10.
Wedin et al., "Early indicators of tail biting outbreaks in pigs," Appl. Anim. Behav. Sci., Nov. 2018, 208:7-13.
Zhang et al., "Automatic individual pig detection and tracking in pig farms," Sensors, Mar. 2019, 19(5):1188, 20 pages.
Zhang, "Microsoft kinect sensor and its effect," IEEE Multimedia, Feb. 2012, 19(2):4-10.
Zhong et al., "Paper: Re-ranking person re-identification with k-reciprocal encoding," Paper, Presented at Proceedings of the IEEE Conference on Computer Vision and Pattern Recognition, Venice, Italy, Oct. 22-29, 2017, 10 pages.
Zhu et al., "Paper: Automatic Animal Detection from Kinect Sensed Images for Livestock Monitoring and Assessment," Paper, Presented at Proceedings of the 2015 IEEE International Conference on Computer and Information Technology, Liverpool, UK, Oct. 26-28, 2015, pp. 1154-1157.

* cited by examiner

O 66 PPP 1 1
W II 555 N N
T MM 777 Q Q
K YY HHH J J

MATERIALS AND METHODS FOR LONG-TERM TRACKING OF GROUP-HOUSED LIVESTOCK

CROSS REFERENCE TO RELATED APPLICATIONS

This application is a National Stage Application under 35 U.S.C. § 371 and claims the benefit of International Application No. PCT/US2021/037967, filed on Jun. 17, 2021, which claims the benefit of priority under 35 U.S.C. 119(e) to U.S. Application No. 63/040,951 filed on Jun. 18, 2020. The entire contents of these applications are incorporated herein by reference in their entirety.

TECHNICAL FIELD

This disclosure generally relates to materials and methods for long-term tracking of group-housed livestock.

BACKGROUND

It is necessary to observe animals on an individual level in order to assess their health and wellbeing and ensure efficient production. One of the most significant challenges to industry is its reliance upon subjective human observation for assessment, which can be as low as only a few seconds per animal each day. This challenge is enhanced when symptoms are subtle and the mere presence of humans encourages animals to alter or mask individual symptoms to disguise signs of illness/injury. Despite the fact that researchers have been able to identify links between health and behavior, the limitations of human observation make it difficult to achieve a timely diagnosis of compromised animals and intervene on their behalf.

A technological solution that augments and expands beyond the limitations of human observation could address many of these challenges.

SUMMARY

In one aspect, a computer-implemented method of tracking animals is provided. Such a method typically includes recognizing, by using at least one data processor, individual animals in images of a plurality of the animals; and tracking the animals using a probabilistic tracking-by-detection process.

In another aspect, a system for recognizing animals is provided. Such a system typically includes an instance detection and part localization module; a visual marker classification module; a fixed-cardinality track interpolation module; and a maximum a posteriori estimation of animal identity module.

Unless otherwise defined, all technical and scientific terms used herein have the same meaning as commonly understood by one of ordinary skill in the art to which the methods and compositions of matter belong. Although methods and materials similar or equivalent to those described herein can be used in the practice or testing of the methods and compositions of matter, suitable methods and materials are described below. In addition, the materials, methods, and examples are illustrative only and not intended to be limiting. All publications, patent applications, patents, and other references mentioned herein are incorporated by reference in their entirety.

DESCRIPTION OF DRAWINGS

FIG. 5. The 16 unique ear tags used in this work to identify individual pigs. The tags use alphanumeric characters printed on Destron Fearing™ Hogmax ear tags.

FIG. 10. Failure cases for the proposed method in three different scenarios. The left images contain ground truth annotations and the right images are visualizations of the output of the proposed method.

DETAILED DESCRIPTION

Figure 1:
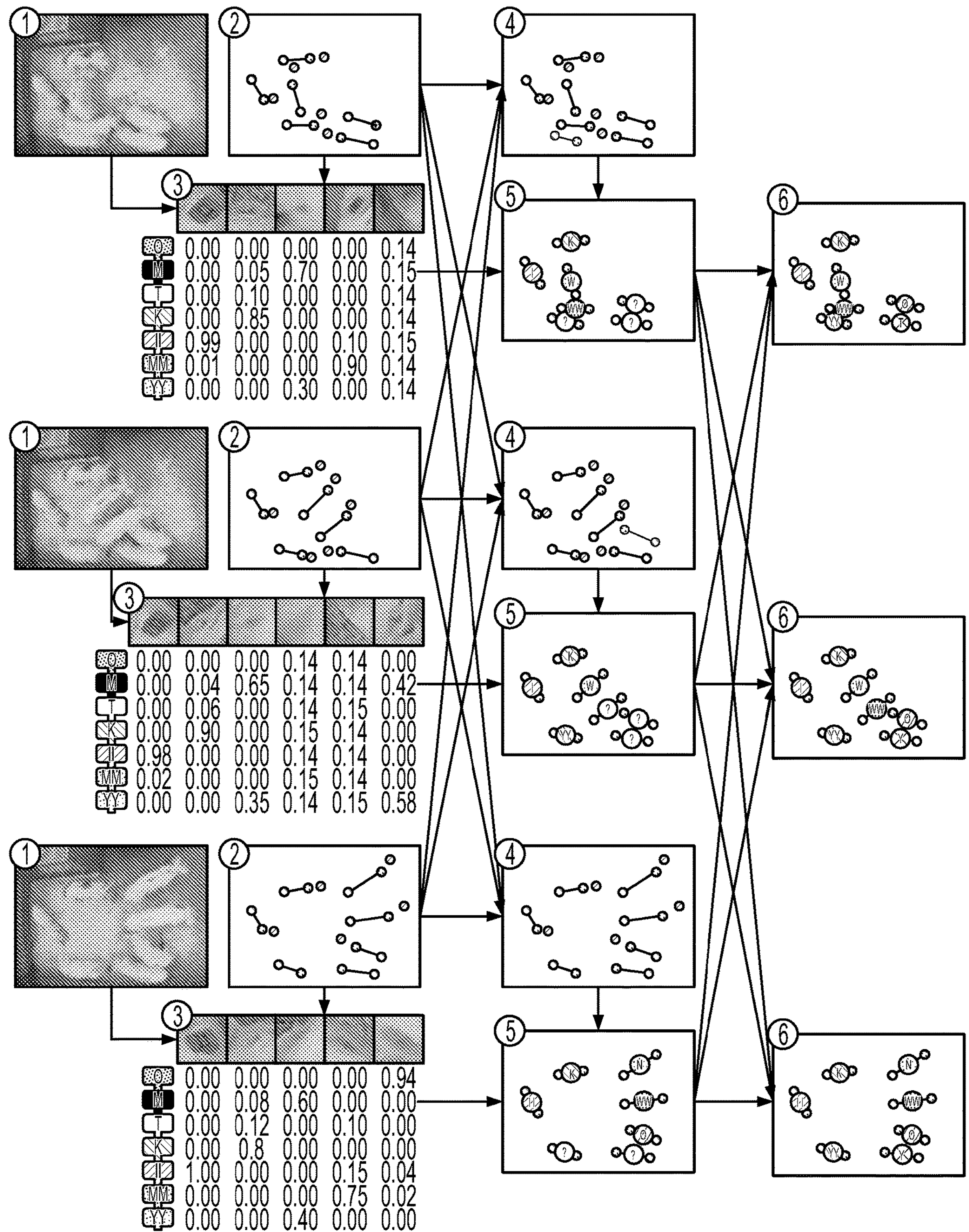
FIG. 1. Three consecutive frames illustrating the six stages of processing. The input image (1) are processed using the detection method to find the locations of pigs, as defined by their matched shoulder-tail coordinates (2). Detected ear locations (2) are used to extract small image crops that can be used for ear tag classification (3). Here, there are seven possible ear tag IDs and each cropped image is mapped to a probability vector (3). The original detections (2) across all frames are used to interpolate missing detections (4). The ear tag probability vectors are mapped to all detections to initialize the ID probabilities prior to inference (5). Finally, ear tag ID probabilities are shared across frames using forward-backward MAP estimation to derive consistent IDs.

Tracking group-housed livestock is a challenging task that necessitates novel solutions. Existing methods for tracking pedestrians provide a wide range of useful techniques, however, they are designed around a set of assumptions that do not generally hold for group-housed livestock. They often assume that first or second order movement models can be used to separate targets as they move through the scene [41, 42]. While this may be true for short time segments, movement models are incapable of overcoming the inevitability of swaps and lost targets due to occlusions. To recover from these inevitable failure cases, existing methods are trending toward deep feature-based target re-identification [43, 44]. However, the ability to re-identify a target based upon unique features breaks down when the targets are homogeneous (lacking discernible physiological differences), as is often the case for livestock populations.

To address these challenges, researchers have taken a variety of different approaches. The method introduced by Nasirahmadi et al. [45] characterizes group behaviors using shape fitting techniques [46] customized to their targets. Although variations in the environment and presentation of the animals were limited, they were able to demonstrate accurate multi-target detection of group-housed pigs. One of the first attempts at using supervised learning to detect and track group-housed pigs was introduced by Nilsson et al. [47]. Their results, while promising, were limited to ideal viewing conditions and the method was not designed to handle occlusions.

With the introduction of the Microsoft Kinect depth camera [48], researchers began leveraging depth camera capabilities for animal tracking [49-59]. Not only do depth cameras make it relatively easy to separate foreground objects from a static background, but they also make it possible to track objects using known properties of their three-dimensional shapes. One example was introduced by Ju et al. [27], where targets were first detected using the YOLO network [60] and then a separate stage of post-processing was used to separate objects with shared bounding box areas. This method demonstrated a high level of accuracy (92%), but it was limited to three group-housed pigs. An alternative approach by Mittek et al. [61] used iterative ellipsoid-fitting to track target locations and orientations. The method provides an average of 20 min of continuous tracking without errors, however, the lack of an accompanying detection method meant that each pig's location needed manual initialization prior to operation. Furthermore, the method does not include a way to recover from error events or re-identify targets in the event that they are swapped or lost.

Arguably the most important contributing factor to a tracking method's success is the performance of its detector [62]. Fortunately, detection accuracy has improved markedly over the past ten years due to methods like R-CNN [63], YOLO [60], and Mask R-CNN [35]. Furthermore, methods that detect objects as collections of joined parts, such as OpenPose [64] and PersonLab [65], make it possible to infer the location and pose of targets. This has significant implications for animal tracking, as it makes it possible to more reliably associate detections across frames of video and it provides more details regarding target activities and social interactions. One of the first attempts to detect animals as a collection of parts was introduced by Ardo et al. [26]. They trained and applied a neural network to detect keypoints of cattle that were visible from a top-down view. Results demonstrated that the method was capable of 95% accuracy in the trained environment, but dropped to 55% when applied in new environments not seen during training.

The method introduced by Psota et al. [28] provides a method for detecting and associating the body part locations of pigs using a fully-convolutional neural network. By representing targets as a collection of body parts, their method can infer more detailed activities and social interactions than would be possible with bounding-box approaches. They also released a publicly available dataset with 2000 annotated images of 24,842 individually pigs from 17 different locations. Results demonstrated that the method could achieve a precision of 0.99 and a recall of 0.96 when the network was trained on the environment. This performance dropped when applied to new environments, demonstrating the importance of fine-tuning with new data.

Zhang et al. [29] proposed a method to detect pigs and associate them across frames using a combination of trainable methods. Detection is based on the architecture of the Single-Shot Detector (SSD) [66] and it is used to identify pigs via a location near the middle of their backs, which they refer to as "tag-boxes." To associate detections between frames, they apply a trainable correlation filter to the tag-box regions to track pigs as a single feature point in the images. Results are presented on a dataset containing five videos averaging 39 s in duration. The conditions in the videos are varied, however, they consistently depict nine large (finisher) pigs. While the results are promising, the method does not include a method for absolute identification. Therefore, it cannot be expected to achieve reliable long-term tracking.

This paper introduces a long-term tracking strategy that leverages the high-precision detection outputs provided by [28]. Despite the sophistication of modern motion modeling and target association methods, long-term tracking is bound to fail at some point. This can be due to the complex movements and interactions between targets, camera obstructions, or power outages. Recovery from these inevitable tracking failures is a daunting challenge when the targets are as visually indistinguishable as group-housed pigs. To address this challenge, the proposed method augments the appearance of each pig with visually distinguishable ear tags. The ear tags, while not always visible, provide intermittent opportunities to recover from tracking failures, i.e., when target IDs are swapped. A MAP estimation framework is derived to problematically merge the outputs of tracking-by-detection with ID information provided by ear tag observations.

This paper presents a method for long-term tracking of individual livestock in group-house settings. The method takes advantage of the power of deep convolutional neural networks to detect individual targets and classify their identities. A probabilistic framework is used to efficiently combine per-frame detection and classification across long frame sequences.

The publicly-available, human-annotated dataset introduced in this work can be used to evaluate performance for long-term tracking of group-housed livestock. By representing a variety of different environments, ages/sizes of animals, activity levels, and lighting conditions, the dataset exposes the strengths and weaknesses of tracking methods. Results demonstrate that the method achieves an average precision and recall greater than 0.9 across a variety of challenging scenarios. While this work focuses on pigs, it is expected that the underlying techniques could easily be adopted to a variety of other livestock animals.

This location and orientation tracking method could be used as the foundation for a more sophisticated tracker of activity and behavior. In terms of extracting activities, it would be relatively straight-forward to convert the image-space tracking outputs to pen-space distance traveled using known camera parameters and pose estimation to the pen space. Eating, drinking, and social interactions can be approximated from proximity of targets to fixed landmarks and other targets.

In this work, industry-standard ear tags were used for visual identification. Ideally, long-term tracking of individuals could be achieved without augmenting targets. However, the homogeneity of livestock populations makes it difficult to discern differences between individuals. Preliminary work suggests that this might be possible using facial recognition [71], but applications to long-term tracking are untested and facial recognition would likely require addition cameras in the pen space to get close-up shots.

In accordance with the present invention, there may be employed conventional molecular biology, microbiology, biochemical, and recombinant DNA techniques within the skill of the art. Such techniques are explained fully in the literature. The invention will be further described in the following examples, which do not limit the scope of the methods and compositions of matter described in the claims.

EXAMPLES

The proposed multi-object tracking method is designed for animals living in fixed group-house environments. While pigs were used in this study to develop the techniques and evaluate the performance, the methodology applies to a variety of targets that satisfy the following assumptions.

1. Video footage is obtained from a static camera mounted above the environment of interest.
2. The field of view of the camera encompasses the entire living space.
3. The number of targets remains constant and each is equipped with a unique visual marker.

Figure 2:
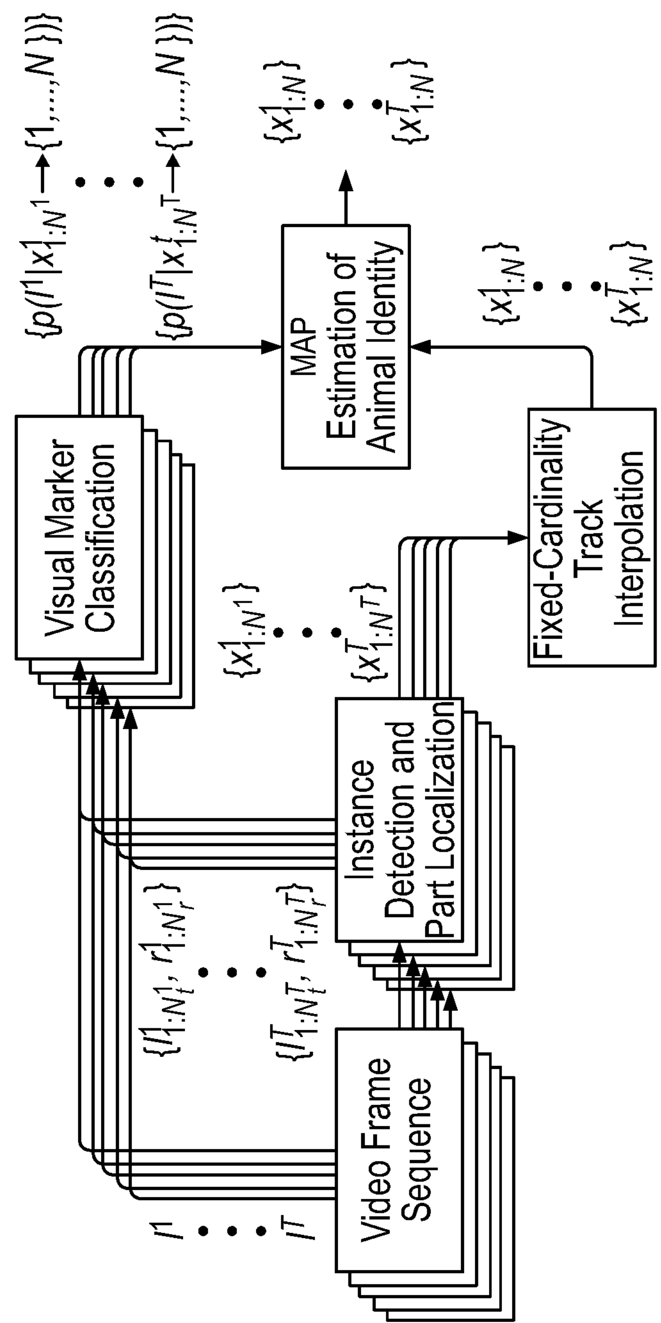
FIG. 2. Flow diagram of the proposed method. The input consists of a sequence of consecutive frames $\{1^1, \ldots, 1^T\}$. Information extracted from the frames is used to detect and track individual targets as well as classify their identities using visual marker classification. Finally, the last stage merges tracks with identify likelihoods to achieve maximum a posteriori (MAP) estimation of the location of each target in the frames, denoted $\{\{\hat{x}_{1:N}{}^1\}, \ldots, \{\hat{x}_{1:N}{}^T\}\}$.

The processing steps of the proposed method are illustrated in FIG. 2 and each is referred to as a module. This section begins with an overview of each module and an introduction to the notation used throughout this paper. The details of the modules are then provided.

The method begins with a video represented by the set of images $$I^{1:T}=\{I^1, \ldots, I^T\},$$

where T is the number of consecutive images in the video sequence. First, the images are processed by the Instance Detection and Part Localization module to detect targets and extract the image coordinates of each instance. Specifically, for the $t^{th}$ frame, the set of $N^t$ instances detected by the module are denoted $$x_{1:N^t}{}^t=\{x_1{}^t, \ldots, x_{N^t}{}^t\}.$$

Note that the pig index n for $x_n{}^t$ does not correspond with the true identity of the pig. Rather, this is simply an index indicating the order in which it was detected in frame t and, at this stage, no correspondence is assumed between $x_n{}^t$ and $x_n{}^{t+1}$. In this work, the shoulder and tail locations define each instance, so $$x_n{}^t=\{s_n{}^t, t_n{}^t\},$$

where $s^t_n$ is the two-dimensional image coordinate of the shoulder for instance n in frame t and $t^t_n$ is the corresponding coordinates of the tail.

The Instance Detection and Part Localization module also detects the locations of all visual markers. In this work, the visual markers correspond to physical ear tags in the left and/or right ears. In frame t, the collection of two-dimensional image coordinates of left ears is defined as $$l_{1:N_l}{}^t=\{l_1{}^t, \ldots, l_{N_l}{}^t\}.$$

and the collection of right ear tag coordinates is defined as $$r_{1:N_r}{}^t=\{r_1{}^t, \ldots, r_{N_r}{}^t\}.$$

Note that the estimated number of visual markers $N_l{}^t$ and $N_r{}^t$ can be greater or less than the number of detected instances $N^t$. For each detected visual marker location, a crop is taken from the original image around that marker's location. This cropped image is then passed through the Visual Marker Classification module to predict the class membership of the visual marker and associate that prediction with the set of instances. The output of this module is a likelihood $$p(I_t|x_n{}^t\rightarrow\{1, \ldots, N\})$$

that image $I_t$ was observed given that the detected instance $x_n{}^t$ has an ID of 1, 2, . . . , N.

Ideally, the number of detected instances $N^t$ for any given frame t will be equal to the known number of targets, N. However, the detector will miss some instances (false negatives) and also detect instances in incorrect locations (false positives). The Fixed-Cardinality Track Interpolation module processes the output of the detector and produces a fixed number of targets in each frame. It begins by limiting the number of detection in each frame by removing the least confident detections so that $$N^t\leq N\forall t=1, \ldots, T.$$

Then, the module associates detections between frames into continuous tracks and interpolates target locations when detections are missing. The result is N continuous tracks that span the entire video sequence.

Finally, the output of the Visual Marker Classification module is combined with the continuous tracking output of the Fixed-Cardinality Track Interpolation module to estimate the most likely IDs associated with each detection. This process takes place in the MAP Estimation of Animal Identity module. The output of the module is an ordered set of detections $$\{\hat{x}_{1,1:N}\}, \ldots, \{\hat{x}_{1:N}{}^t\}=\{\hat{x}_{1,1}, \ldots, \hat{x}_{1,N}\}, \ldots, \{\hat{x}_1{}^T, \ldots, \hat{x}_N{}^T\},$$

where $\hat{x}_n{}^t$ indicates the location of target n in the $t^{th}$ frame.

3.1. Instance Detection and Part Localization

Tracking-by-detection methods begin with a per-frame detector that finds the location of individual instances. In this work, the detection method produces a set of instance locations $$\{x_{1:N^t}\}=\{x_1{}^t, \ldots, x_{N^t}{}^t\}$$

for each frame t=1, . . . , N. Furthermore, each instance is defined by its two-dimensional, image-space, pairwise shoulder, and tail location, which can be represented by $$x_n{}^t=\{s_n{}^t, t_n{}^t\}.$$

The detection method also detects the locations of visual markers in the image space. In this work, these locations correspond to the pixel coordinates of the left and right ears of the pigs, denoted $$l_{1:N_l^t}{}^t=\{l_1^t, \ldots, l_{N_l^t}{}^t\} \text{ and } r_{1:N_l^t}{}^t=\{r_1^t, \ldots, r_{N_l^t}{}^t\}$$

respectively.

Figure 3:
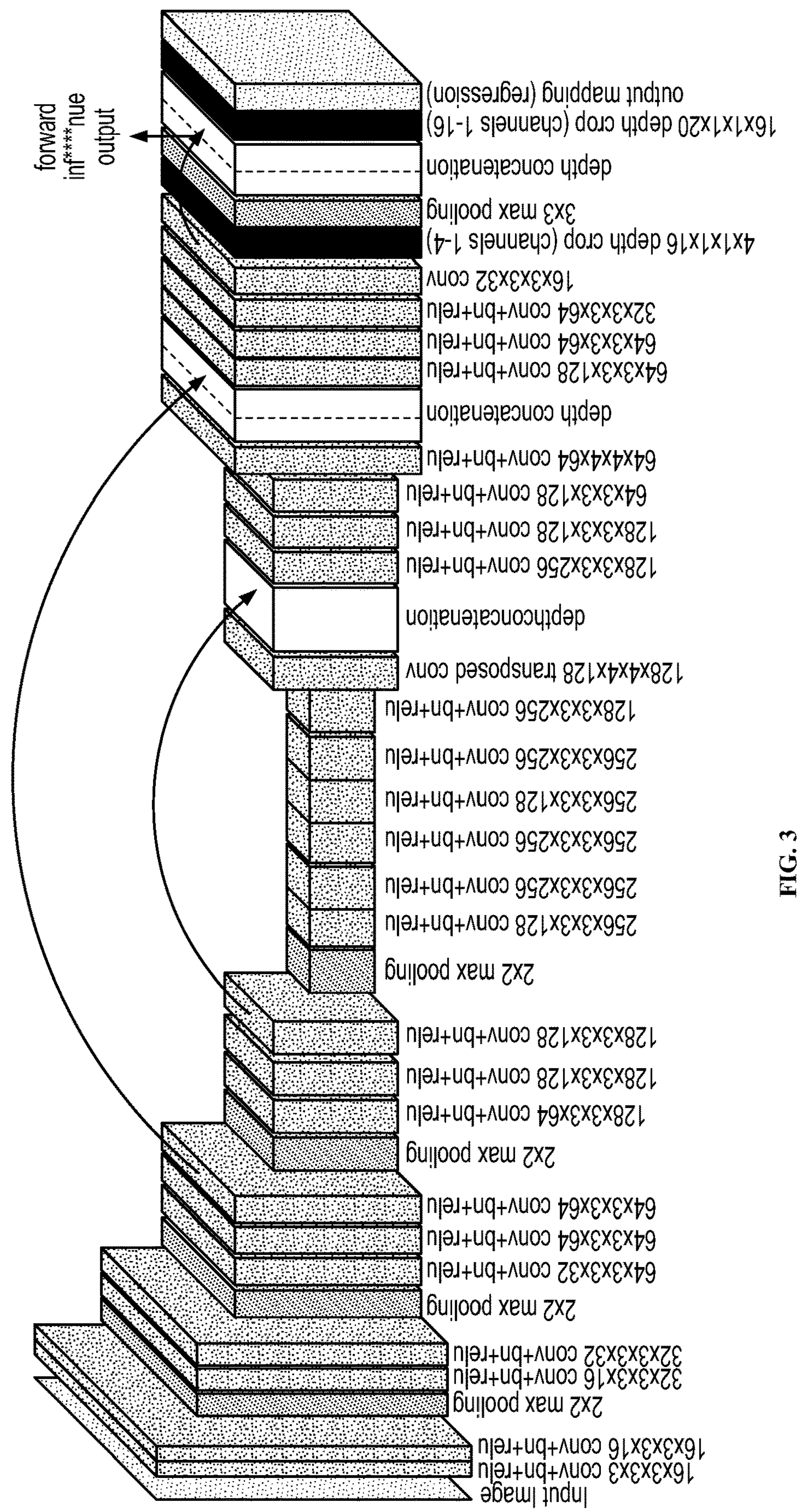
FIG. 3. The hourglass-shaped network used by the proposed method to convert images to 16-channel image-space instance detection maps. The black arrows indicate a copy for depth concatenation. The gray depth crop layers indicate untrainable convolutional layers that isolates certain channels of the input. While the final output layer is used for training with MSE regression, the output of the 3rd depth concatenation is used for forward inference. By including the 3×3 max pooling output of the channels 1-4 along with their original outputs, this allows for fast peak detection in post-processing.

The proposed detection method is largely based on the method presented in [28], and the network architecture is illustrated in FIG. 3. Instead of using the original network with maxpooling and maxunpooling layers, the network used in this work adopts a more efficient U-net architecture [67].

This architecture is characterized by the use of depth concatenations following transposed convolutions for upsampling. The depth concatenations serve two key purposes. First, this allows for accelerated training because there are more direct paths from the network output to earlier layers in the network. This advantage was first demonstrated by the ResNet [34] architecture and, subsequently, the DenseNet [68] architecture. The second function of the depth concatenations is to allow the network to produce fine details in the output feature space. Early maxpooling layers remove spatial details and make it difficult for transposed convolutions to produce detailed outputs at higher resolutions. Thus, by concatenating the network output prior to maxpooling after each transposed convolution, the network has access to higher resolution details.

It is worth noting that the DeepLabV3+[69] architecture was also considered for this application. DeepLabV3+ is characterized by the use of atrous convolutions to preserve the feature-space resolutions of networks like ResNet [34] that natively downsample by a factor of 64 from, for example, a 224×224 input to a 7×7 feature space. Instead of drastically downsampling the network, the atrous convolutions expand the reach of convolutions, making it possible to preserve the receptive field while maintaining spatial precision with a larger feature space. Furthermore, the DeepLabV3+ network finishes by processing the feature space with a set of narrow and wide atrous convolutions so that the network is able to reuse features from multiple scales instead of having to train feature extraction differently for big and small objects.

Despite the popularity of the DeepLabV3+ network architecture for semantic segmentation tasks, it was empirically deemed to be unsuitable for this application. This was due to its inability to recover fine spatial details in the output feature space. It is likely that the strength of this architecture—its ability to detect objects regardless of scale—was not critical to this application. While the targets do vary in size, the consistent camera setup and relatively homogeneous presentation of the targets made this application much different than such things as segmenting images from the COCO dataset. In addition, fine detail is critical for the animal tracking application, but it is not critical to achieve high scores on semantic segmentation benchmarks where 50% intersection over union (IoU) is sufficient for detection.

There are three major changes to the architecture presented in [28] that make this network more efficient. First, as discussed earlier, maxunpooling layers were removed and replaced with transposed convolutions. Maxunpooling operations are generally slower because they require the network to pass indices that vary from one image to another. The second major change is that the output is left at a 4× down-sampled resolution instead of upsampling all the way back up to the original resolution. The objects/parts being detected are expected to be strictly larger than a 4×4 window in the input image resolution and sub-pixel interpolation is used to detect the real-valued locations within the feature space. Thus, this lower resolution output has sufficient spatial detail and it removes the burden of computing regional maximums over large image spaces. Finally, the third major change is that the regional maximum values for the channels corresponding to body part locations are calculated within the network structure by a 3×3 maxpooling layer. This regional maximum computation happens on the GPU during forward inference, and it adds a negligible increase to the time required by the GPU to process each image. Regional maximums are used to find local maximum responses indicating the pixel locations of target body parts. By performing maxpooling in-network and concatenating this output with the body part mapping prior to maxpooling, region maximums can be quickly found with simple pixel-wise "is equal" comparisons in post-processing.

3.2. Fixed-Cardinality Track Interpolation

After detecting instances using the method described in Section 3.1, the sequence of detected target locations $$\{x_{1:N^1}{}^1, \ldots, x_{1:N^T}{}^T\}$$

is used to construct continuous tracks for exactly N targets. The proposed tracking method begins by removing high-cost detections whenever $N^t > N$ for all t=1, . . . , T. Here, cost is defined for each instance using $$C(x_n^t) = \frac{|(t \to s)_n^t - s_n^t| + |(s \to t)_n^t - t_n^t|}{2 \times |s_n^t - t_n^t| \times (\text{score } (s_n^t) + \text{score } (t_n^t))}, \quad (1)$$

where $s^t_n$, and $t^t_n$ are the two-dimensional shoulder and tail coordinates that define the location of the instance. Furthermore, $(t \to s)^t_n$ is the estimated shoulder coordinates taken from the tail coordinate $t^t_n$, and $(s \to t)^t_n$ is the estimated tail coordinates taken from the shoulder coordinate $s^t_n$. These estimates and their use in detecting instances are discussed in detail in [28]. The metrics score $(s^t_n)$ and score $(t^t_n)$ are the outputs in the shoulder and tail detection channels of the network output. When the shoulder and tail location estimates are perfect, i.e., $$(t \to s)_n{}^t = s_n{}^t \text{ and } (s \to t)_n{}^t = t_n{}^t, \text{the cost } C(x_n{}^t)=0.$$

In addition, the cost of an instance increases as the score of the shoulder and tail detection decrease. It is worth noting that the minimum values of score $(s^t_n)$ and score $(t^t_n)$ are lower bounded to 0.25 so the most that these terms can increase the cost is by a factor of 2. When they are below 0.25, these parts are not detected and cannot contribute to an instance. In contrast, when they are both equal to one, the cost is decreased by a factor of 2.

Figure 4:
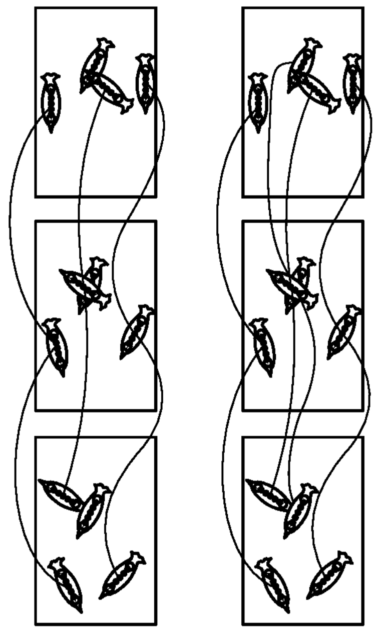
FIG. 4. The figures illustrate a situation with four pigs in three consecutive frames. In the first stage (top-left), three of the four pigs are tracked and one is missed in the middle frame due to partial occlusion. As a result that there is an unassigned pig from the previous frame, that pig's location is duplicated and marked as a duplicate (top-right). With a consistent number targets per frame, the Hungarian algorithms is used to join targets between frames (bottom-left). Finally, the locations of the duplicates are interpolated smoothly between detections (bottom-right).
Figure 4:
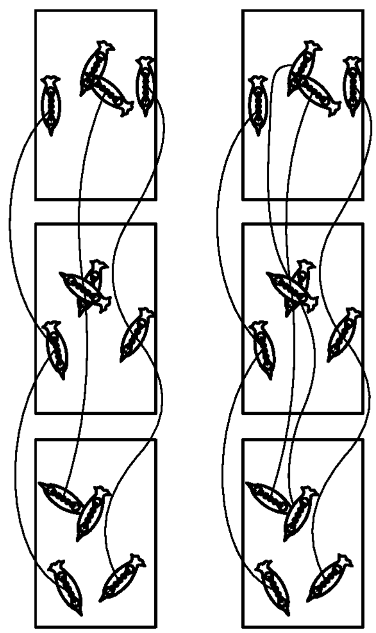

Once the detections per frame are limited to $N^t \le N$ for all t=1, . . . , T, a set of N continuous tracks can be approximated using Algorithm 1. FIG. 4 illustrates a simple example of the algorithm's stages for four targets in three consecutive frames. The first step in the process is to scan the frames from 1 to T and duplicate detections from the previous frame any time they are not assigned to the next frame via the Hungarian algorithm. In the second stage, the frames are processed in the reverse order and duplicates are again created for missed assignments. All links between detections created via the Hungarian algorithm are stored in memory and, after the second stage, there will be N continuous tracks across all T frames. When a duplicate is created in either the first or second stage, it is marked as a duplicate. Finally, the locations of duplicates are interpolated by finding the nearest detections looking forward and backward in time and creating the interpolated location by weighing the detected locations by their distance in time from the duplicate. The equation for the interpolated position is given in Algorithm and an example of how this might change the position of the duplicate is illustrated in the bottom two sequences of FIG. 4.

Algorithm 1: Fixed-Cardinality Track Interpolation for $t = 1, 2, \ldots, T-1$ do
| Compute $d(x_i^t, x_j^{t+1}) = |s_i^t - s_j^{t+1}| + |t_i^t - t_j^{t+1}|$ for all $i \neq j$
| Apply Hungarian to d to assign $x_{1:N^t}^t \rightarrow x_{1:N^{t+1}}^{t+1}$
| for all unassigned detections $x_i^t \in x_{1:N^t}^t$ do
| | $x_{1:N^{t+1}}^{t+1} \leftarrow x_{1:N^{t+1}}^{t+1} \cup x_i^t$
| | $N^{t+1} \leftarrow N^{t+1} + 1$
| | Mark detection $N^{t+1}$ as a duplicate
| end
end
for $t = T, T-1, \ldots, 2$ do
| Compute $d(x_i^t, x_j^{t-1}) = |s_i^t - s_j^{t-1}| + |t_i^t - t_j^{t-1}|$ for all $i \neq j$
| Apply Hungarian to d to assign $x_{1:N^t}^t \rightarrow x_{1:N^{t-1}}^{t-1}$
| for all unassigned detections $x_i^t \in x_{1:N^t}^t$ do
| | $x_{1:N^{t-1}}^{t-1} \leftarrow x_{1:N^{t-1}}^{t-1} \cup x_i^t$
| | $N^{t-1} \leftarrow N^{t-1} + 1$
| | Mark detection $N^{t-1}$ as a duplicate
| end
end
for all duplicates $x_n^t$ do
| Scan backward using Hungarian assignments until first non-duplicate $x_{n-}^{t-}$ is encountered
| Scan forward using Hungarian assignments until first non-duplicate $x_{n+}^{t+}$ is encountered
|
$$x_n^t \leftarrow \frac{|t - t^+| \times x_{n-}^{t-} + |t - t^-| \times x_{n+}^{t+}}{|t^+ - t^-|}$$
end

3.3. Visual Marker Classification

In applications where unique visual identification of animals is important, it is common for livestock to be issued permanent ear tags. Serial numbers are common, however, they are not ideal for visual identification. Therefore, a different set of tags was designed and used in this work.

Figure 5:
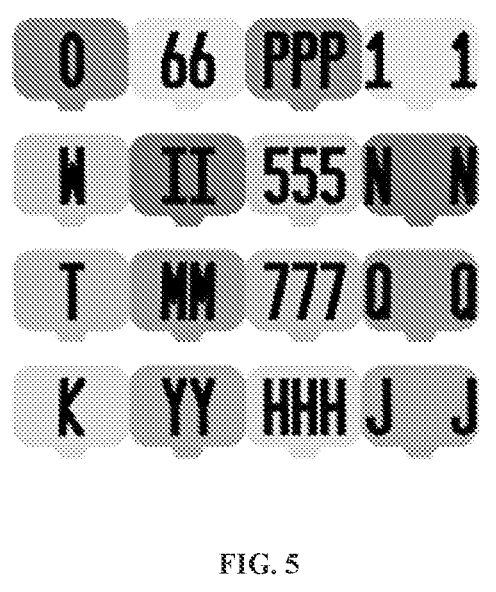
Figure 6:
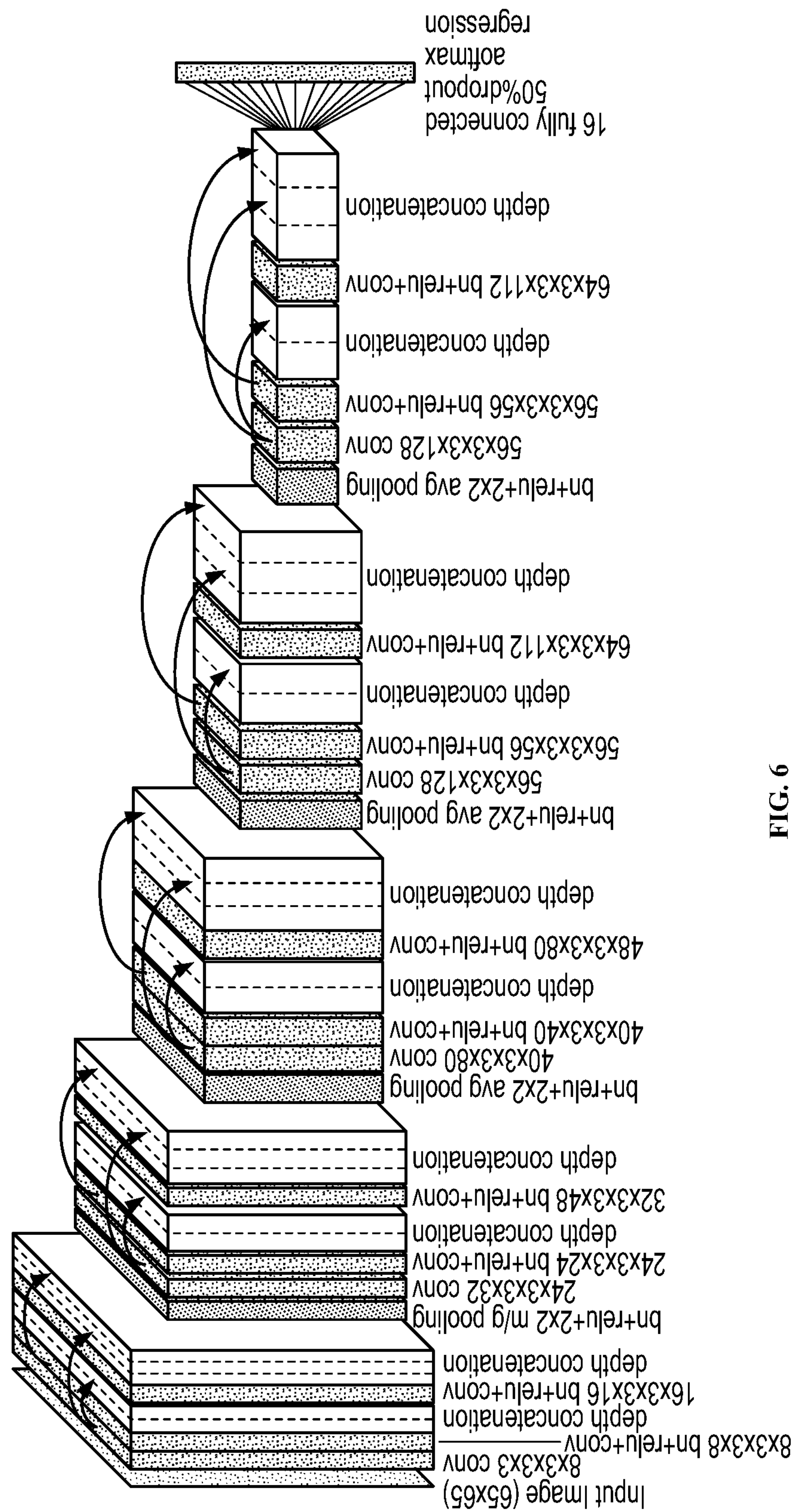
FIG. 6. The deep neural network used to classify tags from 64×64 crops at the ear locations.

The set of 16 tags, illustrated in FIG. 5, includes a variety of different color/alphanumeric character combinations. The specific combination chosen here was intended to be easily recognizable for people, even in difficult viewing conditions. For the proposed tracking system, the tags serve as an absolute way to identify each animal and recover from tracking errors. When an ear is located in the image, that section of the image centered at the ear is cropped to a 65×65 image. The cropped image is then processed by the convolutional neural network shown in FIG. 6 to provide a likelihood that the observed ear is equipped with one of the known tags. The network was designed using the DenseNet architecture [68] (with k=8).

At each time step t an observation $I^t$ is made regarding the specific identity of each left or right ear location, denoted $r_i^t$ or $l_i^t$, respectively. The ear location will be denoted $e_i^t$ to simplify notation, and any operation that applies to $e_i^t$ applies to both $r_i^t$ and $l_i^t$. In this case, the observation is confined to a 65×65 window around the animal's ear. The trained network uses this observation to derive the probability $$p(e_i^t \rightarrow \{1, \ldots, N\} | I^t)$$

of ear tag $e_i^t$ having identity $\{1, \ldots, N\}$, given an observation $I^t$.

Target instances are defined by pairs of shoulder and tail locations. The network provides association vectors to predict the locations of shoulders from both the right and left ear. Thus, instead of making hard decisions regarding which ear belongs to which instance, the association vectors are used to evaluate the probability that an ear tag belongs to an instance. Specifically, the average back-and-forth distance between ears and shoulders is found using $$d(s_i^t, e_j^t) = \frac{|(e \rightarrow s)_j^t - s_i^t| + |(s \rightarrow e)_i^t - e_j^t|}{2 \times |s_i^t - e_j^t|}. \tag{2}$$

As this distance increases, the probability that the ear is linked to the shoulder is decreased with a decaying exponential given by $$p(s_i^t \rightarrow e_j^t) = \max(10^{-6}, e^{-10 \times d(s_i^t, e_j^t)}), \tag{3}$$

where a lower bound of $10^{-6}$ prevents network over-confidence from creating instability.

Finally, the probability $$p(x_i^t \rightarrow \{1, \ldots, N\} | I^t)$$

of assigning a specific identity to an instance is initialized with a uniform probability of 1/N and, for each tag and each detected instance, the probability is modified using a weighted summation of the network output and the uniform probability. This calculation is given by $$p(x_i^t \rightarrow n | I^t) = \frac{1}{N} \prod_{j=1}^{N_e^t} \left( p(s_i^t \rightarrow e_j^t) p(e_j^t \rightarrow n | I^t) + (1 - p(s_i^t \rightarrow e_j^t)) \frac{1}{N} \right). \tag{4}$$

In the extremes of $$p(s_i^t \rightarrow e_j^t),$$

this results in $$p(x_i^t \rightarrow n | I^t) \approx \frac{1}{N}$$

when none of the tag locations are strongly linked to the instance location and it results in $$p(x_i^t \rightarrow n | I^t) \approx p(e_i^t \rightarrow n | I^t)$$

when ear tag $e_j^t$ is a highly confident match to instance location $x_i^t$. It should also be noted that $$p(x_i^t \rightarrow n | I^t) \propto p(I^t | x_i^t \rightarrow n)$$

when all tags are equally likely to be observed and, for the purposes of optimization, the probability of the observation does not affect probability maximization.

3.4. Maximum A-Posteriori (MAP) Estimation of Animal Identity

In livestock tracking applications with frame rates exceeding 4 fps, targets move very little between frames. Therefore, a "stay put" motion model is adopted here. Let $$p(x_i^t|x_j^{t-1})$$

be the probability of transitioning to state $x_i^t$ given that the tracked target was previously in state $x^{t-1}_j$, and let the distance between $x_i^t$ and $x^{t-1}_j$ be defined as $$\delta(x_i^t,x_j^{t-1})=\sqrt{|s_i^t-s_j^t|^2+=t_i^t-t_j^t|^2}. \tag{5}$$

Figure 7:
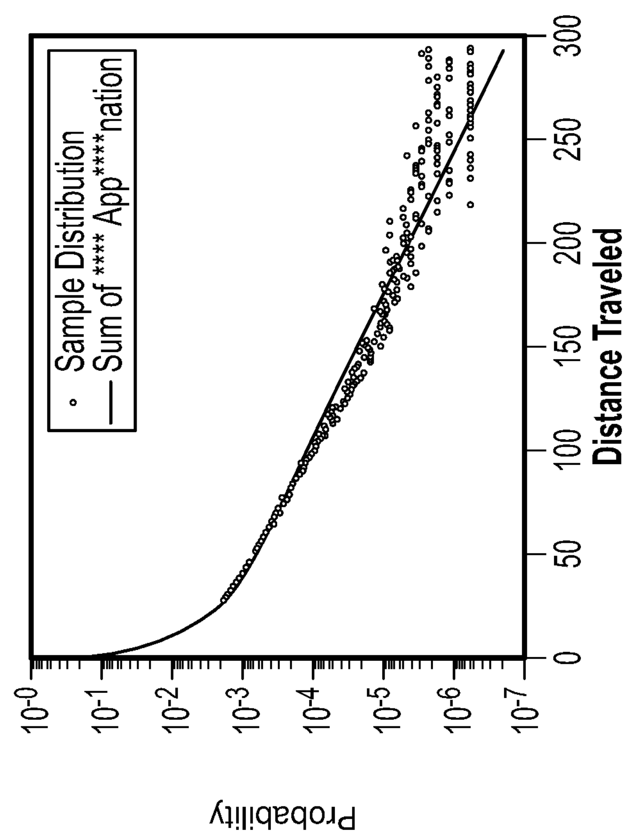
FIG. 7. The distribution of Euclidean distances between targets in neighboring frames (blue dots) is approximated using a weighted sum of exponential distributions (solid orange line).

Using a labeled dataset, described in detail in Section 5, a set of 1.73 million samples was collected and its distribution is given by the blue dots in FIG. 7. This distribution can not be closely approximated by a single exponential distribution. Instead, it requires a weighted sum of three exponential distributions to achieve the approximation illustrated by the orange line in FIG. 7.

The equation for the approximate distribution is $$p(x_i^t \mid x_j^{t-1}) \approx 0.6 \times \frac{9}{10} e^{-9\delta(x_i^t, x_j^{t-1})/10} + 0.3 \times \frac{1}{6} e^{-\delta(x_i^t, x_j^{t-1})/6} + 0.1 \times \frac{1}{30} e^{-\delta(x_i^t, x_j^{t-1})/30}. \tag{6}$$

Equation (4) provides the likelihood of the observation given a specific identity for the target and Equation (6) provides the probability of a target transitioning between frames from one location to another. Together, these two probabilities make it possible to calculate the Maximum A-Posteriori (MAP) estimate of each target's identity.

The proposed method aims to evaluate the probability that target n exists in state $x_i^t$ given the entire sequence of observations $\{I^1, \ldots, I^T\}$. This probability, previously denoted $$p(x_i^t \to n|I^t),$$

will now be shortened to $$p(x_i^t|I^t)$$

to simplify notation. As a consequence, it is assumed that the following operations are performed separately for all $n=1, \ldots, N$. If we assume conditional independence between past and future observations given the current state, the probability can be represented by $$p(x_i^t \mid I^{1:T}) = p(x_i^t \mid I^{1:t}, I^{t+1:T}) = \frac{p(x_i^t, I^{1:t}, I^{t+1:T})}{p(I^{1:t}, I^{t+1:T})} = \frac{p(I^{1:t} \mid x_i^t) p(x_i^t \mid I^{t+1:T}) p(I^{t+1:T})}{p(I^{1:t}) p(I^{t+1:T})}, \tag{7}$$

where $I^{a:b}=\{I^a, \ldots, I^b\}$ is used to simplify notation. The probability of the observations themselves do not affect maximization, thus the expression can be further reduced to $$p(x_i^t|I^{1:N}) \propto p(I^{1:t}|x_i^t) p(x_i^t|I^{t+1:T}). \tag{8}$$

This set of posterior marginals can be found using the forward-backward algorithm, which operates by sequentially computing the forward probabilities $$\alpha^t(x_i^t)=p(I^{1:t}|x_i^t)$$

and backward probabilities $$\beta^t(x_i^t)=p(x_i^t|I^{t+1:T})$$

at each time step $t=1, \ldots, T$. The update equation for the forward probabilities is given by N $$\alpha^t(x_i^t) = p(I^t \mid x_i^t) \sum_{j=1}^{N} \alpha^{t-1}(x_j^{t-1}) p(x_i^t \mid x_j^{t-1}), \tag{9}$$

where $$\alpha_1(x_i^1) = p(I^1|x_i^1).$$

For backward probabilities, the sequential update equation is $$\beta^t(x_i^t) = \sum_{j=1}^{N} \beta^{t+1}(x_j^{t+1}) p(x_i^t \mid x_j^{t+1}) p(I^{t+1} \mid x_j^{t+1}), \tag{10}$$

where $$\beta_1(x_i^1) = 1 \forall k = 1, \ldots, N.$$

Finally, the posterior marginal probability can be computed at each time step as $$p(x_i^t|I^{1:N}) \propto \alpha^t(x_i^t) \beta^t(x_i^t). \tag{11}$$

In theory, the standard form of the forward-backward algorithm is suitable for evaluating and comparing the probabilities of target memberships. In practice, however, when implemented in software with floating point precision variables, underflow becomes an unavoidable problem. Essentially, the magnitudes of probabilities become so low that they reach the lower limit of the variable type and are either forced to zero or set to a fixed lower bound. In either case, the value of the probabilities is no longer accurate, creating instability in the system.

To avoid underflow, the forward-backward algorithm can be implemented using the log-sum-exp method [70]. This approach operates by adding the logarithms of the probabilities instead of multiplying them, creating a much wider dynamic range. However, the fact that the original expressions for the forward and backward term include summations makes it necessary to add an additional exponent and logarithm. The expression for the logarithm of the forward term becomes $$\log(\alpha^t(x_i^t)) = \log(p(I^t \mid x_i^t)) + \log\left(\sum_{j=1}^{N} \exp\overbrace{(\log(\alpha^{t-1}(x_j^{t-1}) + \log(p(x_i^t \mid x_j^{t-1}))))}^{a_{x^{t-1}}}\right). \tag{12}$$

In this expression, there remains a significant risk of underflow when the values of $a_x t_{-1}$ become large magnitude negative numbers. For this reason, the value $a_{max}=\max_x t_{-1}{}^{a}{}_{x}t_{-1}$ is computed and subtracted from each term within the summation. The revised expression $$\log(\alpha^t(x_i^t)) = \log(p(I^t \mid x_i^t)) + \log\left(\sum_{j=1}^{N} \exp\left(\log(\alpha^{t-1}(x_j^{t-1})) + \log(p(x_i^t \mid x_j^{t-1})) - a_{max}\right)\right) + a_{max} \tag{13}$$

sets the largest value of arguments within the exponent to zero and then adds back the value of $a_{max}$ outside of the summation. The following two expressions for the logarithm of the backward term perform an equivalent set of tricks to avoid underflow.

$$\log(\beta^t(x_i^t)) = \log\left(\sum_{j=1}^{N} \exp\overbrace{\left(\log(\beta^{t+1}(x_j^{t+1})) + \log(p(x_i^t \mid x_j^{t+1}) + \log(p(I^{t+1} \mid x_j^{t+1}))\right)}^{b_{x_i^{t-1}}}\right) \tag{14}$$

$$\log(\beta^t(x_i^t)) = \log\Big(\textstyle\sum_{j=1}^{N} \exp(\log(\beta^{t-1}(x_j^{t+1})) + \log(p(x_i^t \mid x_j^{t+1}) + \log(\beta^{t-1}(x_j^{t+1})) + \log(p(I^{t+1} \mid x_j^{t+1})) - b_{max})\Big) + b_{max} \tag{15}$$

Finally, the logarithm of the marginal probability is given by $$\log(p(x_i^t \mid I^{1:T})) \propto \log(\alpha^t(x_i^t)) + \log(\beta^t(x_i^t)) \tag{16}$$

and, as discussed earlier, this probability is calculated for each n=1, . . . , N. An optimal bipartite assignment for each frame t is then achieved by applying the Hungarian algorithm to minimize an N×N matrix of costs given by $$\begin{pmatrix} -\log(p(x_1^t \to 1 \mid I^{1:T})) & -\log(p(x_2^t \to 1 \mid I^{1:T})) & \dots & -\log(p(x_N^t \to 1 \mid I^{1:T})) \\ -\log(p(x_1^t \to 2 \mid I^{1:T})) & -\log(p(x_2^t \to 2 \mid I^{1:T})) & \dots & -\log(p(x_N^t \to 2 \mid I^{1:T})) \\ \vdots & \vdots & \ddots & \vdots \\ -\log(p(x_1^t \to N \mid I^{1:T})) & -\log(p(x_2^t \to N \mid I^{1:T})) & \dots & -\log(p(x_N^t \to N \mid I^{1:T})) \end{pmatrix} \tag{17}$$

The output of the assignment is an ordered set of detections, denoted $$\{\hat{x}_{1:N}{}^{1}\}, \dots, \{\hat{x}_{1:N}{}^{T}\}.$$

4. Training Details and Evaluation Methodology

Tracking performance is evaluated on a collection of videos by comparing the system outputs to human-annotations, where both the shoulder-tail location and ear tag ID are provided for each animal in each frame. The following three scenarios are considered in the evaluation.

1. Location: The user is only interested in the location/orientation of each animal and the specific ID can be ignored. This scenario applies when only pen-level metrics are desired, such as average distance traveled per animal or pen space utilization.
2. Location and ID (Initialized): Both the location/orientation and the ID of each animal are desired and the human annotations are provided for the first frame. This scenario assumes that several videos are being processed in sequence and that tracking results from the previous video are available. Location/orientation with ID are important for individualized metrics, such as monitoring health and identifying aggressors.
3. Location and ID (Uninitialized): This scenario is the same as Location and ID (Initialized), except that human annotations are not provided for the first frame. This is the most challenging scenario because it forces the method to visually ID each animal from intermittent views of the ear tags within the time span of the video.

The method described in Section 3 is evaluated according to each of these scenarios in Section 5.

In the following, network training used to convert ear tag views into likelihood vectors is described in Section 4.1. Then, the dataset used for evaluation is described in detail in Section 4.2 and the metrics used for tracking success and failure are defined in Section 4.3.

4.1. Ear Tag Classification

Figure 8:
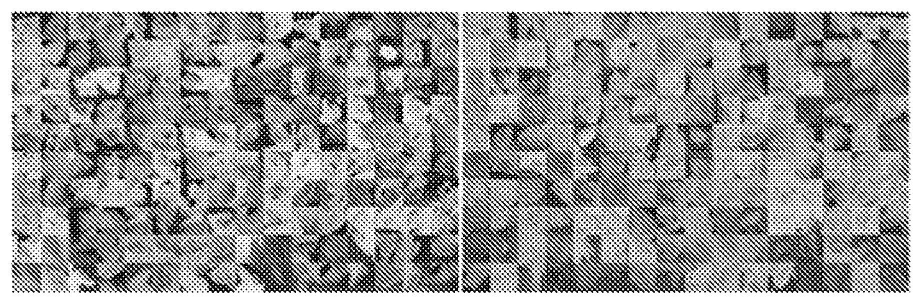
FIG. 8. Samples of each tag crops used to train the deep classification network. The left image depicts crops taken from daytime color images and the right image depicts crops taken from nighttime infrared images. The first eight rows provide samples of each of the 16 tag types. The last two rows illustrate samples from the unknown tag ID category.

The proposed method identifies both the location and ID of each pig via separate networks. The dataset used to train the detector was introduced and provided by [28]. A set of 13,612 cropped color images of ear tag locations were used to train a classification network. A separate network was trained for grayscale (infrared) images using 6819 cropped images. The crops were labeled via human annotated as either belonging to one of the 16 known ear tags or to a category of "unknown tag ID." When a tag image is classified as unknown tag ID, its target likelihood vector for training is set to 1/16 for all categories. FIG. 8 provides eight samples of each tag category along with 32 examples of unknown tag ID for both color and grayscale images.

Ear tag classification training was done using stochastic gradient decent with momentum (0.9). It is important to note that, while the output is passed through a softmax layer to ensure a valid probability vector, training is done with MSE regression on the outputs. This allows for the network to target both one-hot vectors and uniform probabilities.

4.2. Dataset Description

To evaluate the proposed tracking method, a human-annotated dataset was created. The data, along with cropped ear tag images and their corresponding categorizations, is available for download at psrg.unl.edu/Projects/Details/12-Animal-Tracking. It contains a total of 15 videos, each of which is 30 min in duration. The resolution of the videos is 2688×1520 and each was captured and annotated at 5 frames per second (fps). This frame rate was chosen empirically because it was deemed the minimum rate at which a human observer could comfortably interpret and annotate the video, keeping up with nearly all kinds of movement in the pen environment. Higher frame rates are nearly always better for tracking, but they come at the expense of increased processing times and, after a certain point, the improvements to tracking become negligible.

Figure 9:
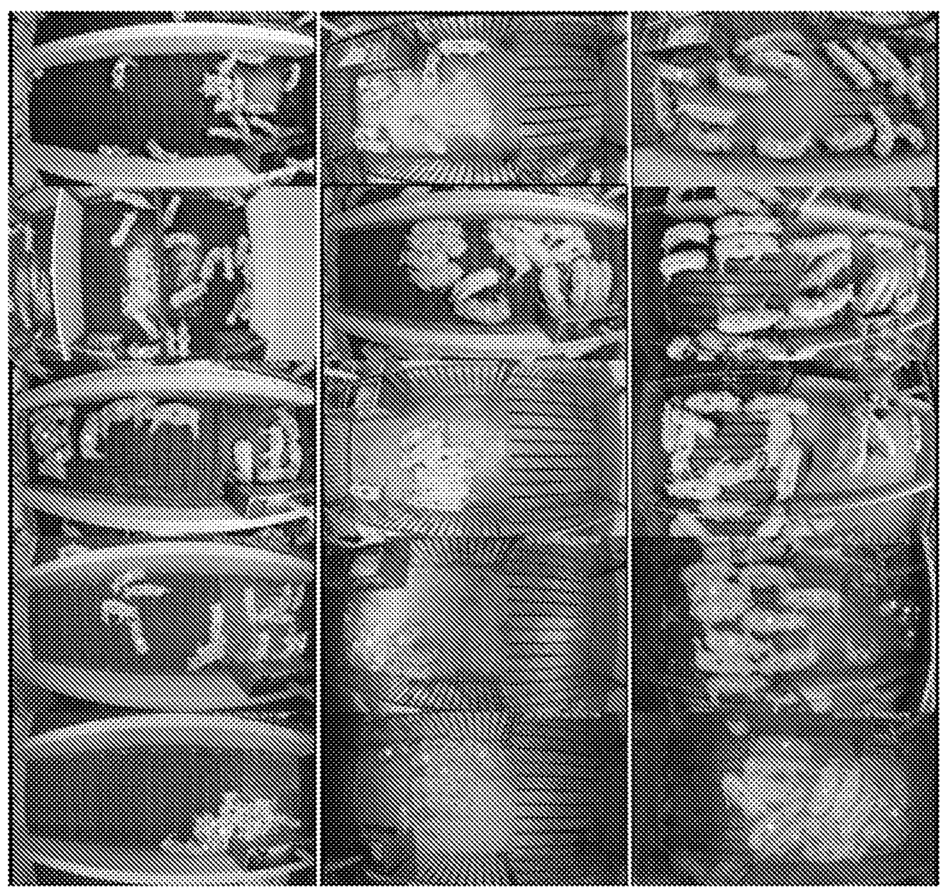
FIG. 9. The first frames of the fifteen videos used to evaluate tracking performance. Annotations over each pig illustrate the position of the pig's tail and shoulder along with the tag ID that each pig is equipped with (located between the shoulder and tail locations). The first column represents videos of the nursery phase (3-10 weeks old), the middle column represents the early finisher phase (11-18 weeks old), and the last column represents the late finisher phase (19-26 weeks old). The five rows correspond to high activity during the day, medium activity during the day, low activity during the day, medium activity during the night, and low activity during the night.

The videos depict different environments, numbers of pigs, ages of pigs, and lighting conditions. Table 1 summarizes the videos and their properties. FIG. 9 shows the first frame of each video with each pig's shoulder, tail, and ID illustrated via annotation. Note that annotations are provided for every frame of the video, but only the first frame is show here.

TABLE 1

Properties of the fifteen videos captured and annotated for tracking performance analysis. For each age range (nursery, early finisher, and late finisher), three videos were captured during the day with the lights on and two videos were captured at night using IR video capture and IR flood lights to illuminate the scene. The activity levels for the pigs were subjectively categorized as either High (H), Medium (M), or Low (L).

| | Nursery | | | | | Early Finisher | | | | | Late Finisher | | | | |
|---|---|---|---|---|---|---|---|---|---|---|---|---|---|---|---|
| Video # | 1 | 2 | 3 | 4 | 5 | 6 | 7 | 8 | 9 | 10 | 11 | 12 | 13 | 14 | 15 |
| Day | X | X | X | | | X | X | X | | | X | X | X | | |
| Night | | | | X | X | | | | X | X | | | | X | X |
| # of Pigs | 16 | 16 | 15 | 16 | 16 | 7 | 15 | 7 | 8 | 8 | 16 | 14 | 12 | 14 | 13 |
| Activity Level | H | M | L | M | L | H | M | L | M | L | H | M | L | M | L |

4.3. Performance and Analysis

To analyze tracking performance, a matched detection and a missed detection must be defined. Unlike many tracking applications, the number of targets in the field of view remains constant in group-housing livestock facilities and the ground truth position of the head and tail of each target is provided in each frame. Furthermore, it is assumed that the tracker knows how many targets are in the environment, so the number of detections provided by the tracker and the number of targets in the scene are always equal. Let $$\{\hat{x}_{1:N}^{1}\}, \ldots, \{\hat{x}_{1:N}^{T}\}.$$

be the collection of N shoulder-tail pixel coordinates for T frames of a video sequence provided by a tracking algorithm, and let $$\{\bar{x}_{1:N}^{1}\}, \ldots, \{\bar{x}_{1:N}^{T}\}.$$

denote the corresponding ground truth human annotations. The distance between the predicted target i's position and the actual position of target i in frame t is defined as $$\Delta(\bar{x}_i^t, \hat{x}_i t^\prime) = |\bar{s}_i^t - \hat{s}_i^t| + |\bar{t}_i^t - \hat{t}_i^l| \quad (18)$$

and the length of the ground truth target from shoulder to tail is $$l(\bar{x}_i^t) = |\bar{s}_i^t - \bar{t}_i^t|. \quad (19)$$

Given these two definitions, successful matching events are defined as follows.

Successful Match (Location and ID):

$$i = \underset{j=1,\ldots,N}{\operatorname{argmin}} \Delta(\bar{x}_j^t, \hat{x}_i^t) \text{ and } i = \underset{j=1,\ldots,N}{\operatorname{argmin}} \Delta(\bar{x}_i^t, \hat{x}_j^t) \text{ and } \Delta(\bar{x}_i^t, \bar{x}_i^t) < \ell(\bar{x}_i^t)$$

Successful Match (Location):

$$k = \underset{j=1,\ldots,N}{\operatorname{argmin}} \Delta(\bar{x}_j^t, \hat{x}_i^t) \text{ and } i = \underset{j=1,\ldots,N}{\operatorname{argmin}} \Delta(\bar{x}_i^t, \hat{x}_j^t) \text{ and } \Delta(\bar{x}_i^t, \bar{x}_i^t) < \ell(\bar{x}_i^t)$$

The first condition states that detection i must be closest to ground truth i and vice versa, while the sum of the shoulder-to-shoulder and tail-to-tail distances must not exceed the shoulder-to-tail distance of the ground truth. This distance, while heuristic, adapts to pigs of any size and ensures that the detected and ground truth locations are a plausible match. The second condition is less strict than the first. It imposes a back-and-forth matching criteria that requires that the minimum-distance match for the detection is also the minimum-distance match for the ground truth, but their indices (tag IDs) do not need to coincide.

5. Results

The results of the proposed tracking method after being evaluated using the dataset are provided in Table 2. It is worth noting that, because the number of targets is known to the detector and each target's location is approximated in each frame, the number of false positives and false negatives is equal. Thus, precision and recall are the same.

TABLE 2

Precision/recall results for all 15 videos in the human-annotated dataset. The precision/recall results in "Location" do not require the tracker to provide the correct ID for animals. Instead, it is only required that each animal's location is matched with a detection. The "Location and ID" results require the tracker to correctly identify the location and correct ID of a pig in order to be counted as a true positive. The "(Uninitialized)" variant does not provide the location and ID of each pig in the first frame, whereas the "(Initialized)" variant does.

| | Activity | | | | | |
|---|---|---|---|---|---|---|
| Age | High (Day) | Medium (Day) | Low (Day) | Medium (Night) | Low (Night) | Average |
| Location | | | | | | |
| Nursery | 0.9267 | 0.9964 | 0.9985 | 0.9548 | 0.8405 | 0.9434 |
| Early Finisher | 0.9961 | 0.9973 | 1.0000 | 0.9349 | 1.0000 | 0.9857 |
| Late Finisher | 0.9907 | 0.9890 | 0.9969 | 0.9564 | 1.0000 | 0.9866 |
| Average | 0.9711 | 0.9943 | 0.9984 | 0.9487 | 0.9468 | 0.9719 |

TABLE 2-continued

Precision/recall results for all 15 videos in the human-annotated dataset. The precision/recall results in "Location" do not require the tracker to provide the correct ID for animals. Instead, it is only required that each animal's location is matched with a detection. The "Location and ID" results require the tracker to correctly identify the location and correct ID of a pig in order to be counted as a true positive. The "(Uninitialized)" variant does not provide the location and ID of each pig in the first frame, whereas the "(Initialized)" variant does.

| | Activity | | | | | |
|---|---|---|---|---|---|---|
| Age | High (Day) | Medium (Day) | Low (Day) | Medium (Night) | Low (Night) | Average |
| Location and ID (Initialized) | | | | | | |
| Nursery | 0.8893 | 0.9941 | 0.9933 | 0.8958 | 0.6256 | 0.8796 |
| Early Finisher | 0.9949 | 0.9847 | 1.0000 | 0.8716 | 1.0000 | 0.9702 |
| Late Finisher | 0.9836 | 0.9580 | 0.9897 | 0.8569 | 0.8462 | 0.9269 |
| Average | 0.9559 | 0.9789 | 0.9943 | 0.8748 | 0.8239 | 0.9256 |
| Location and ID (Uninitialized) | | | | | | |
| Nursery | 0.8893 | 0.9941 | 0.6940 | 0.7927 | 0.6108 | 0.7962 |
| Early Finisher | 0.9948 | 0.9718 | 1.0000 | 0.8946 | 0.5888 | 0.8900 |
| Late Finisher | 0.9836 | 0.8176 | 0.9897 | 0.6290 | 0.5252 | 0.7890 |
| Average | 0.9559 | 0.9278 | 0.8946 | 0.7721 | 0.5749 | 0.8251 |

As anticipated, the worst performance occurs when the locations and IDs of each pig are uninitialized, with an average precision/recall is 0.8251. This situation forces the method to infer the ID of each animal from glimpses of their ear tags within the 30-min duration of the video. The "Late Finisher: Low (Night)" video has the worst performance, at 0.5252 precision/recall. FIG. 10 illustrates the ground truth and network output for several error examples, and the top one shows the first frame of the "Late Finisher: Low (Night)" video. Only seven of the 13 pigs are labeled with the correct ID, even though all 13 are detected and oriented correctly. This video is particularly challenging for ear tag classification because, in addition to being at night when ear tags are already more difficult to discern, half of the pigs do not significantly change position during the 30 min record time. Therefore, ear tag presentations are not varied enough to confidently identify each individual pig. It's worth noting that, in an actual deployment of the system where multiple 30 min segments are processed in sequence, there is a good chance that the ear tags will be viewed and classified in preceding videos.

The "uninitialized" assumption is really a worst case scenario that ignores prior observations.

The second row of FIG. 10 illustrates a different kind of error. The pig labeled '66' is sitting in the corner of the pen and its tail area is occluded by pig 'II'. Pig 'II' also has its head occluded and the method, at some point earlier, detected a pig with reversed shoulder and tail at the same location at 'II'. This detection likely occurred when '66' was partially occluded and the method assigned the erroneous detection to the '66' ID. In general, occlusions cause missed detections (false negatives) and the method is susceptible to mistaking the shoulders for the tail area when the pig's head is down toward the ground and not visible to the camera.

Errors in the third row of FIG. 10 illustrate a situation where multiple targets are not detected for long enough periods of time that the method holds their last observed location until they are re-identified. This occurred for two reasons. First, pigs viewed from the side are more prone to occlusion than pigs viewed from a top-down perspective. Second, targets are smaller in this view so the detection network has less pixels and, correspondingly, less features per target. This could be at least partially corrected by processing larger images, but this would come at the expense of longer processing times.

Hardware and Processing Times

The method was implemented in MATLAB using the Deep Learning Toolbox. The desktop computer used to process the videos has an Intel i9-9900K 8-core CPU, 32 GB of DDR4 RAM, 512 GB of m.2 SSD memory, and an NVIDIA RTX2080ti GPU. Before processing frames with the fully-convolutional detector, they are downsampled to a resolution of 576×1024×3 (rows×columns×channels), and 24 frames are stacked together before processing on the GPU. It takes the computer≈0.5 s to process the batch of 24 images. To classify ear tags, all ear tag windows are gathered together into a large batch of 64×64×3 images and processed all-at-once by the classification network. Classification takes, on average, 0.2 s for 24 images. All other processes involved in detection, including reading video frames and down-sampling, consume an additional 0.7 s per batch of 24 images. Thus, detection and ear tag classification take approximately 0.054 s per frame (18.5 fps).

The proposed multi-object tracking method using fixed-cardinality interpolation and forward-backward inference takes 20 s to process a 30-min video with 16 pigs and this time drops to 6 s with 7 pigs. Fixed-cardinality interpolation consumes approximately 75% of that time and forward-backward inference uses the remaining 25%. The computational complexity of fixed-cardinality interpolation is $O(TN^3)$, where T is the number of frames and N is the number of targets. This is due to the fact that the Hungarian algorithm, with complexity $O(N^3)$, is used to associate every pair of neighboring frames. In practice, with 16 targets, this adds 0.01 s per frame and brings the total to 0.064 s per frame (15.6 fps). The videos used to analyze the method were recorded at 5 fps, so this performance demonstrates that video can comfortably be processed in real-time.

REFERENCES

1. PIC North America. Standard Animal Care: Daily Routines; Wean to finish manual; PIC North America: Hendersonville, TN, USA, 2014; pp. 23-24.
2. Jack, K. M.; Lenz, B. B.; Healan, E.; Rudman, S.; Schoof, V. A.; Fedigan, L. The effects of observer presence on the behavior of Cebus capucinus in Costa Rica. Am. J. Primatol. 2008, 70, 490-494. [CrossRef] [PubMed]

3. Iredale, S. K.; Nevill, C. H.; Lutz, C. K. The influence of observer presence on baboon (*Papio* spp.) and rhesus macaque (*Macaca mulatta*) behavior. Appl. Anim. Behay. Sci. 2010, 122, 53-57. [CrossRef] [PubMed]
4. Leruste, H.; Bokkers, E.; Sergent, O.; Wolthuis-Fillerup, M.; Van Reenen, C.; Lensink, B. Effects of the observation method (direct v. from video) and of the presence of an observer on behavioural results in veal calves. Animal 2013, 7, 1858-1864. [CrossRef] [PubMed]
5. Matthews, S. G.; Miller, A. L.; Clapp, J.; Plötz, T.; Kyriazakis, I. Early detection of health and welfare compromises through automated detection of behavioural changes in pigs. Vet. J. 2016, 217, 43-51. [CrossRef]
6. Wedin, M.; Baxter, E. M.; Jack, M.; Futro, A.; D'Eath, R. B. Early indicators of tail biting outbreaks in pigs. Appl. Anim. Behay. Sci. 2018, 208, 7-13. [CrossRef]
7. Burgunder, J.; Petrželková, K. J.; Modry, D.; Kato, A.; MacIntosh, A. J. Fractal measures in activity patterns: 'Do gastrointestinal parasites affect the complexity of sheep behaviour? Appl. Anim. Behay. Sci. 2018, 205, 44-53. [CrossRef]
8. Tuyttens, F.; de Graaf, S.; Heerkens, J. L.; Jacobs, L.; Nalon, E.; Ott, S.; Stadig, L.; Van Laer, E.; Ampe, B. Observer bias in animal behaviour research: Can we believe what we score, if we score what we believe? Anim. Behay. 2014, 90, 273-280. [CrossRef]
9. Wathes, C. M.; Kristensen, H. H.; Aerts, J. M.; Berckmans, D. Is precision livestock farming an engineer's daydream or nightmare, an animal's friend or foe, and a farmer's panacea or pitfall? Comput. Electron. Agric. 2008, 64, 2-10. [CrossRef]
10. Banhazi, T. M.; Lehr, H.; Black, J.; Crabtree, H.; Schofield, P.; Tscharke, M.; Berckmans, D. Precision livestock farming: An international review of scientific and commercial aspects. Int. J. Agric. Biol. Eng. 2012, 5, 1-9.
11. Tullo, E.; Fontana, I.; Guarino, M. Precision livestock farming: An overview of image and sound labelling. In Proceedings of the European Conference on Precision Livestock Farming 2013:(PLF) EC-PLF, KU Leuven, Belgium, 10-12 Sep. 2013; pp. 30-38.
12. Taylor, K. Cattle health monitoring using wireless sensor networks. In Proceedings of the Communication and Computer Networks Conference, Cambridge, MA, USA, 8-10 Nov. 2004.
13. Giancola, G.; Blazevic, L.; Bucaille, I.; De Nardis, L.; Di Benedetto, M. G.; Durand, Y.; Froc, G.; Cuezva, B. M.; Pierrot, J. B.; Pirinen, P.; et al. UWB MAC and network solutions for low data rate with location and tracking applications. In Proceedings of the 2005 IEEE International Conference on Ultra-Wideband, Zurich, Switzerland, 5-8 Sep. 2005; pp. 758-763.
14. Clark, P. E.; Johnson, D. E.; Kniep, M. A.; Jermann, P.; Huttash, B.; Wood, A.; Johnson, M.; McGillivan, C.; Titus, K. An advanced, low-cost, GPS-based animal tracking system. Rangeland Ecol. Manag. 2006, 59, 334-340. [CrossRef]
15. Schwager, M.; Anderson, D. M.; Butler, Z.; Rus, D. Robust classification of animal tracking data. Comput. Electron. Agric. 2007, 56, 46-59. [CrossRef]
16. Ruiz-Garcia, L.; Lunadei, L.; Barreiro, P.; Robla, I. A Review of Wireless Sensor Technologies and Applications in Agriculture and Food Industry: State of the Art and Current Trends. Sensors 2009, 9, 4728-4750. [CrossRef]
17. Kim, S. H.; Kim, D. H.; Park, H. D. Animal situation tracking service using RFID, GPS, and sensors. In Proceedings of the 2010 Second International Conference on Computer and Network Technology (ICCNT), Bangkok, Thailand, 23-25 Apr. 2010; pp. 153-156.
18. Escalante, H. J.; Rodriguez, S. V.; Cordero, J.; Kristensen, A. R.; Cornou, C. Sow-activity classification from acceleration patterns: A machine learning approach. Comput. Electron. Agric. 2013, 93, 17-26. [CrossRef]
19. Porto, S.; Arcidiacono, C.; Giummarra, A.; Anguzza, U.; Cascone, G. Localisation and identification performances of a real-time location system based on ultra wide band technology for monitoring and tracking dairy cow behaviour in a semi-open free-stall barn. Comput. Electron. Agric. 2014, 108, 221-229. [CrossRef]
20. Alvarenga, F. A. P.; Borges, I.; Palkovicˇ, L.; Rodina, J.; Oddy, V. H.; Dobos, R. C. Using a three-axis accelerometer to identify and classify sheep behaviour at pasture. Appl. Anim. Behay. Sci. 2016, 181, 91-99. [CrossRef]
21. Voulodimos, A. S.; Patrikakis, C. Z.; Sideridis, A. B.; Ntafis, V. A.; Xylouri, E. M. A complete farm management system based on animal identification using RFID technology. Comput. Electron. Agric. 2010, 70, 380-388. [CrossRef]
22. Feng, J.; Fu, Z.; Wang, Z.; Xu, M.; Zhang, X. Development and evaluation on a RFID-based traceability system for cattle/beef quality safety in China. Food Control 2013, 31, 314-325. [CrossRef]
23. Floyd, R. E. RFID in animal-tracking applications. IEEE Potentials 2015, 34, 32-33. [CrossRef]
24. Neethirajan, S. Recent advances in wearable sensors for animal health management. Sens. Bio-Sens. Res. 2017, 12, 15-29. [CrossRef]
25. Schleppe, J. B.; Lachapelle, G.; Booker, C. W.; Pittman, T. Challenges in the design of a GNSS ear tag for feedlot cattle. Comput. Electron. Agric. 2010, 70, 84-95. [CrossRef]
26. Ardö, H.; Guzhva, O.; Nilsson, M.; Herlin, A. H. Convolutional neural network-based cow interaction watchdog. IET Comput. Vision 2017, 12, 171-177. [CrossRef]
27. Ju, M.; Choi, Y.; Seo, J.; Sa, J.; Lee, S.; Chung, Y.; Park, D. A Kinect-Based Segmentation of Touching-Pigs for Real-Time Monitoring. Sensors 2018, 18, 1746. [CrossRef] [PubMed]
28. Psota, E. T.; Mittek, M.; Pérez, L. C.; Schmidt, T.; Mote, B. Multi-Pig Part Detection and Association with a Fully-Convolutional Network. Sensors 2019, 19, 852. [CrossRef] [PubMed]
29. Zhang, L.; Gray, H.; Ye, X.; Collins, L.; Allinson, N. Automatic individual pig detection and tracking in pig farms. Sensors 2019, 19, 1188. [CrossRef] [PubMed]
30. Krizhevsky, A.; Sutskever, I.; Hinton, G. E. Imagenet classification with deep convolutional neural networks. In Proceedings of the Advances in neural information processing systems, Lake Tahoe, NV, USA, 3-8 Dec. 2012; pp. 1097-1105.
31. LeCun, Y.; Bottou, L.; Bengio, Y.; Haffner, P. Gradient-based learning applied to document recognition. Proc. IEEE 1998, 86, 2278-2324. [CrossRef]
32. Kirk, D. NVIDIA CUDA software and GPU parallel computing architecture. In Proceedings of the ISMM, New York, NY, USA, 19-25 May 2007; pp. 103-104.
33. Jia, Y.; Shelhamer, E.; Donahue, J.; Karayev, S.; Long, J.; Girshick, R.; Guadarrama, S.; Darrell, T. Caffe: Convolutional architecture for fast feature embedding. In Proceedings of the 22nd ACM international conference on Multimedia. ACM, Orlando, FL, USA, 3-7 Nov. 2014; pp. 675-678.

34. He, K.; Zhang, X.; Ren, S.; Sun, J. Deep residual learning for image recognition. In Proceedings of the IEEE conference on computer vision and pattern recognition, Las Vegas, NV, USA, 26 Jun.-1 Jul. 2016; pp. 770-778.

35. He, K.; Gkioxari, G.; Dollár, P.; Girshick, R. Mask r-cnn. In Proceedings of the 2017 IEEE International Conference on Computer Vision (ICCV), Venice, Italy, 22-29 Oct. 2017; pp. 2980-2988.

36. Deng, J.; Dong, W.; Socher, R.; Li, L. J.; Li, K.; Fei-Fei, L. Imagenet: A large-scale hierarchical image database. In Proceedings of the 2009 IEEE conference on computer vision and pattern recognition, Miami Beach, FL, USA, 25-29 Jun. 2009; pp. 248-255.

37. Everingham, M.; Eslami, S. A.; Van Gool, L.; Williams, C. K.; Winn, J.; Zisserman, A. The pascal visual object classes challenge: A retrospective. Int. J. Comput. Vision 2015, 111, 98-136. [CrossRef]

38. Lin, T. Y.; Maire, M.; Belongie, S.; Hays, J.; Perona, P.; Ramanan, D.; Dollár, P.; Zitnick, C. L. Microsoft coco:

Common objects in context. In Proceedings of the European Conference on Computer Vision, New York, NY, USA, 6-12 Sep. 2014; pp. 740-755.

39. Andriluka, M.; Pishchulin, L.; Gehler, P.; Schiele, B. 2d human pose estimation: New benchmark and state of the art analysis. In Proceedings of the IEEE Conference on Computer Vision and Pattern Recognition, Columbus, OH, USA, 24-27 Jun. 2014; pp. 3686-3693.

40. Cordts, M.; Omran, M.; Ramos, S.; Rehfeld, T.; Enzweiler, M.; Benenson, R.; Franke, U.; Roth, S.; Schiele, B. The cityscapes dataset for semantic urban scene understanding. In Proceedings of the IEEE Conference on Computer Vision and Pattern Recognition, Las Vegas, NV, USA, 26 Jun.-1 Jul. 2016; pp. 3213-3223.

41. Dehghan, A.; Modiri Assari, S.; Shah, M. Gmmcp tracker: Globally optimal generalized maximum multi clique problem for multiple object tracking. In Proceedings of the IEEE Conference on Computer Vision and Pattern Recognition, Boston, MA, USA, 7-12 Jun. 2016; pp. 4091-4099.

42. Milan, A.; Leal-Taixé, L.; Reid, I.; Roth, S.; Schindler, K. MOT16: A benchmark for multi-object tracking.

arXiv Preprint 2016, arXiv:1603.00831.

43. Zhong, Z.; Zheng, L.; Cao, D.; Li, S. Re-ranking person re-identification with k-reciprocal encoding. In Proceedings of the IEEE Conference on Computer Vision and Pattern Recognition, Venice, Italy, 22-29 Oct. 2017; pp. 1318-1327.

44. Ristani, E.; Tomasi, C. Features for multi-target multi-camera tracking and re-identification. In Proceedings of the IEEE Conference on Computer Vision and Pattern Recognition, Salt Lake City, UT, USA, 18-22 Jun. 2018; pp. 6036-6046.

45. Nasirahmadi, A.; Richter, U.; Hensel, O.; Edwards, S.; Sturm, B. Using machine vision for investigation of changes in pig group lying patterns. Comput. Electron. Agric. 2015,119, 184-190. [CrossRef]

46. Kashiha, M. A.; Bahr, C.; Ott, S.; Moons, C. P.; Niewold, T. A.; Tuyttens, F.; Berckmans, D. Automatic monitoring of pig locomotion using image analysis. Livest. Sci. 2014,159, 141-148. [CrossRef]

47. Nilsson, M.; Ardö, H.; Aström, K.; Herlin, A.; Bergsten, C.; Guzhva, O. Learning based image segmentation of pigs in a pen. In Proceedings of the Visual observation and analysis of Vertebrate And Insect Behavior—Workshop at the 22nd International Conference on Pattern Recognition (ICPR 2014), Stockholm, Sweden, 24 Aug. 2014; pp. 24-28.

48. Zhang, Z. Microsoft kinect sensor and its effect. IEEE Multimedia 2012, 19, 4-10. [CrossRef]

49. Kongsro, J. Estimation of pig weight using a Microsoft Kinect prototype imaging system. Comput. Electron. Agric. 2014, 109, 32-35. [CrossRef]

50. Zhu, Q.; Ren, J.; Barclay, D.; McCormack, S.; Thomson, W. Automatic Animal Detection from Kinect Sensed Images for Livestock Monitoring and Assessment. In Proceedings of the 2015 IEEE International Conference on Computer and Information Technology, Liverpool, UK, 26-28 Oct. 2015; pp. 1154-1157.

51. Stavrakakis, S.; Li, W.; Guy, J. H.; Morgan, G.; Ushaw, G.; Johnson, G. R.; Edwards, S. A. Validity of the Microsoft Kinect sensor for assessment of normal walking patterns in pigs. Comput. Electron. Agric. 2015, 117, 1-7. [CrossRef]

52. Lee, J.; Jin, L.; Park, D.; Chung, Y. Automatic Recognition of Aggressive Behavior in Pigs Using a Kinect Depth Sensor. Sensors 2016, 16, 631. [CrossRef] [PubMed]

53. Lao, F.; Brown-Brandl, T.; Stinn, J.; Liu, K.; Teng, G.; Xin, H. Automatic recognition of lactating sow behaviors through depth image processing. Comput. Electron. Agric. 2016, 125, 56-62. [CrossRef]

54. Choi, J.; Lee, L.; Chung, Y.; Park, D. Individual Pig Detection Using Kinect Depth Information. KIPS Trans. Comput. Commun. Syst. 2016, 5, 319-326. [CrossRef]

55. Mittek, M.; Psota, E. T.; Perez, L. C.; Schmidt, T.; Mote, B. Health Monitoring of Group-Housed Pigs using Depth-Enabled Multi-Object Tracking. In Proceedings of the Visual observation and analysis of Vertebrate And Insect Behavior, Cancun, Mexico, 4 Dec. 2016; pp. 9-12.

56. Kim, J.; Chung, Y.; Choi, Y.; Sa, J.; Kim, H.; Chung, Y.; Park, D.; Kim, H. Depth-Based Detection of Standing-Pigs in Moving Noise Environments. Sensors 2017, 17, 2757. [CrossRef]

57. Matthews, S. G.; Miller, A. L.; PlÖtz, T.; Kyriazakis, I. Automated tracking to measure behavioural changes in pigs for health and welfare monitoring. Sci. Rep. 2017, 7, 17582. [CrossRef]

58. Pezzuolo, A.; Guarino, M.; Sartori, L.; González, L. A.; Marinello, F. On-barn pig weight estimation based on body measurements by a Kinect vl depth camera. Comput. Electron. Agric. 2018, 148, 29-36. [CrossRef]

59. Fernandes, A.; Dórea, J.; Fitzgerald, R.; Herring, W.; Rosa, G. A novel automated system to acquire biometric and morphological measurements, and predict body weight of pigs via 3D computer vision. J. Anim. Sci., 2018, 97, 496-508. [CrossRef]

60. Redmon, J.; Farhadi, A. YOLO9000: Better, Faster, Stronger. In Proceedings of the IEEE Conference on Computer Vision and Pattern Recognition, Honolulu, HI, USA, 21-26 Jul. 2017; pp. 7263-7271.

61. Mittek, M.; Psota, E. T.; Carlson, J. D.; Perez, L. C.; Schmidt, T.; Mote, B. Tracking of group-housed pigs using multi-ellipsoid expectation maximisation. IET Comput. Vision 2017, 12, 121-128. [CrossRef]

62. Bochinski, E.; Eiselein, V.; Sikora, T. High-speed tracking-by-detection without using image information. In Proceedings of the 2017 14th IEEE International Conference on Advanced Video and Signal Based Surveillance (AVSS), Lecce, Italy, 29 Aug.-1 Sep. 2017; pp. 1-6.

63. Girshick, R.; Donahue, J.; Darrell, T.; Malik, J. Rich feature hierarchies for accurate object detection and semantic segmentation. In Proceedings of the IEEE conference on computer vision and pattern recognition, Columbus, OH, USA, 24-27 Jun. 2014; pp. 580-587.

64. Cao, Z.; Simon, T.; Wei, S. E.; Sheikh, Y. Realtime Multi-Person 2D Pose Estimation using Part Affinity Fields. In Proceedings of the IEEE Conference on Computer Vision and Pattern Recognition, Honolulu, HI, USA, 21-26 Jul. 2017; pp. 7291-7299.

65. Papandreou, G.; Zhu, T.; Chen, L. C.; Gidaris, S.; Tompson, J.; Murphy, K. PersonLab: Person Pose Estimation and Instance Segmentation with a Bottom-Up, Part-Based, Geometric Embedding Model. In Proceedings of the European Conference on Computer Vision, Munich, Germany, 8-14 Sep. 2018; pp. 269-286.

66. Liu, W.; Anguelov, D.; Erhan, D.; Szegedy, C.; Reed, S.; Fu, C. Y.; Berg, A. C. Ssd: Single shot multibox detector. In Proceedings of the European conference on computer vision, Amsterdam, The Netherlands, 11-14 Oct. 2016; pp. 21-37.

67. Ronneberger, O.; Fischer, P.; Brox, T. U-net: Convolutional networks for biomedical image segmentation. In Proceedings of the International Conference on Medical image computing and computer-assisted intervention, Munich, Germany, 5-9 Oct. 2015; pp. 21-37.

68. Huang, G.; Liu, Z.; Van Der Maaten, L.; Weinberger, K. Q. Densely connected convolutional networks. In Proceedings of the IEEE conference on computer vision and pattern recognition, Venice, Italy, 22-29 Oct. 2017; pp. 4700-4708.

69. Chen, L. C.; Zhu, Y.; Papandreou, G.; Schroff, F.; Adam, H. Encoder-decoder with atrous separable convolution for semantic image segmentation. In Proceedings of the European conference on computer vision (ECCV), Munich, Germany, 8-14 Sep. 2018; pp. 801-818.

70. Chen, M.; Liew, S. C.; Shao, Z.; Kai, C. Markov Approximation for Combinatorial Network Optimization. IEEE Trans. Inf. Theory 2013, 59, 6301-6327. [CrossRef]

71. Hansen, M. F.; Smith, M. L.; Smith, L. N.; Salter, M. G.; Baxter, E. M.; Farish, M.; Grieve, B. Towards on-farm pig face recognition using convolutional neural networks. Comput. Ind. 2018, 98, 145-152.

It is to be understood that, while the methods and compositions of matter have been described herein in conjunction with a number of different aspects, the foregoing description of the various aspects is intended to illustrate and not limit the scope of the methods and compositions of matter. Other aspects, advantages, and modifications are within the scope of the following claims.

Disclosed are methods and compositions that can be used for, can be used in conjunction with, can be used in preparation for, or are products of the disclosed methods and compositions. These and other materials are disclosed herein, and it is understood that combinations, subsets, interactions, groups, etc. of these methods and compositions are disclosed. That is, while specific reference to each various individual and collective combinations and permutations of these compositions and methods may not be explicitly disclosed, each is specifically contemplated and described herein. For example, if a particular composition of matter or a particular method is disclosed and discussed and a number of compositions or methods are discussed, each and every combination and permutation of the compositions and the methods are specifically contemplated unless specifically indicated to the contrary. Likewise, any subset or combination of these is also specifically contemplated and disclosed.

What is claimed is:

1. A computer-implemented method of tracking animals, the method comprising:

recognizing, by using at least one data processor, individual animals in images of a plurality of the individual animals;

tracking the individual animals using a probabilistic tracking-by-detection process;

using association vectors generated by a classification network to evaluate a probability that an ear tag belongs to a particular animal in the plurality of the individual animals; and initializing the probability with a uniform probability, wherein for each ear tag and each detected instance of an animal in the plurality of the individual animals, the probability is modified using a weighted summation of an output of the classification network and the uniform probability.

2. The method of claim 1, further comprising:

using fixed cardinality of the individual animals to generate a continuous set of tracks of the plurality of the individual animals, and using a forward-backward algorithm to assign ear-tag identification probabilities to each detected animal in the plurality of the individual animals, wherein the plurality of the individual animals have ear tags and the method further comprises using the classification network to assign unique identification to each detected animal.

3. The method of claim 1, further comprising using a deep, fully-convolutional network to detect each animal in the plurality of the individual animals as a collection of anatomical features.

4. The method of claim 1, further comprising:

using ear tags for visual identification of each animal in the plurality of the individual animals; and using a maximum a posteriori (MAP) forward-backward process to assign ear tag identities to each animal by merging ear tag classification probabilities with identified frame-to-frame movements for the animal.

5. The method of claim 1, further comprising processing frames of a video using an instance detection and part localization module to detect target animals in the plurality of the individual animals and determine image coordinates of each detected target animal.

6. The method of claim 1, wherein recognizing individual animals comprises (i) recognizing a plurality of body parts of the plurality of the individual animals based on processing image data of the plurality of the individual animals and (ii) determining first estimated positions of the plurality of body parts, wherein the plurality of body parts include a plurality of types of body parts.

7. The method of claim 6, further comprising (i) recognizing a plurality of first associations of body parts based on processing the image data and (ii) determining relative positions of body parts in each first association, wherein each first association identifies a relationship between a body part of an animal and at least one other body part of the same animal.

8. The method of claim 1, wherein the individual animals are tracked with an average precision and recall greater than 50%.

9. The method of claim 1, further comprising providing a probabilistic framework for merging classification likelihoods to detections of the individual animals.

10. The method of claim 1, further comprising:

applying at least one recognition module to at least one image of animals to recognize body parts of the animals, in which the body parts include a plurality of types of body parts, and the at least one recognition module outputs first estimated positions of the recognized body parts in the at least one image;

applying the at least one recognition module to the at least one image of animals to recognize first associations of body parts of the animals, in which each first association of body parts associates a body part of an animal with at least one other body part of the same animal, and the at least one recognition module outputs relative positions of the body parts in each recognized first association of body parts;

determining, based on the first estimated positions of the recognized body parts and the relative positions of the body parts in the recognized first associations of body parts, second associations of body parts in which each second association of body parts associates a recognized body part of an animal with at least one other recognized body part of the same animal; and recognizing individual animals in the at least one image based on the second associations of body parts of the animals.

11. The method of claim 1, further comprising:

applying at least one recognition module to at least one image of animals to recognize individual body parts of the animals, wherein the at least one recognition module outputs first estimated locations of the recognized individual body parts in the at least one image;

applying the at least one recognition module to the at least one image of animals to recognize groups of body parts of the animals, wherein the at least one recognition module outputs relative positions of the body parts in each recognized group of body parts;

determining associations of recognized individual body parts based on (i) the first estimated locations of the recognized individual body parts of the animals and (ii) the relative positions of the body parts in the recognized groups of body parts; and recognizing individual animals in the at least one image based on the associations of recognized individual body parts of the animals.

12. The method of claim 1, further comprising:

applying at least one recognition module to at least one image of pigs to recognize body parts of the pigs, in which the body parts include shoulder portions, tail portions, left ears, and right ears of the pigs, wherein the at least one recognition module outputs first estimated locations of the recognized shoulder portions, the recognized tail portions, the recognized left ears, and the recognized right ears in the at least one image;

applying the at least one recognition module to the at least one image of pigs to recognize pairs of body parts of the pigs, including recognizing a pair of shoulder portion and tail portion of each of at least some of the pigs, recognizing a pair of shoulder portion and left ear of each of at least some of the pigs, and recognizing a pair of shoulder portion and right ear of each of at least some of the pigs, and wherein the at least one recognition module outputs a position of the tail portion relative to the corresponding shoulder portion in each recognized pair of shoulder portion and tail portion, a position of the left ear relative to the corresponding shoulder portion in each recognized pair of shoulder portion and left ear, and a position of the right ear relative to the corresponding shoulder portion in each recognized pair of shoulder portion and right ear;

determining, for each of at least some of the recognized shoulder portions, an association with a recognized tail portion, a recognized left ear, and a recognized right ear of the same pig based on (i) the first estimated positions of the recognized shoulder portions, tail portions, left ears and right rears, and (ii) the relative positions of the tail portion and the corresponding shoulder portion in each recognized pair of shoulder portion and tail portion, the relative positions of the left ear and the corresponding shoulder portion in each recognized pair of shoulder portion and left ear, and the relative position of the right ear and the corresponding shoulder portion in each recognized pair of shoulder portion and right ear; and recognizing individual pigs in the at least one image of pigs based on the associations of recognized shoulder portions with recognized tail portions.

13. The method of claim 1, wherein recognizing individual animals comprises using a convolutional detector to recognize the individual animals to provide visible key points of the individual animals, and wherein the probabilistic tracking-by-detection process comprises using, as input, the visible key points of the individual animals provided by the convolutional detector to track the animals over a period of time.

14. The method of claim 7, further comprising:

determining, based on the first estimated positions of the plurality of body parts and the relative positions of body parts in the first associations, a plurality of second associations of body parts, wherein each second association identifies a relationship between a body part of an animal and at least one other body part of the same animal; and recognizing the individual animals in the image data based on the second associations.

15. The method of claim 1, further comprising:

determining a first probability of observation given a specific identity for the particular animal;

determining a second probability of the particular animal transitioning between frames from one location to another; and using the first and second probabilities to calculate a Maximum A-Posteriori (MAP) estimate of an identity of the particular animal.

16. A system for tracking animals, comprising:

at least one data processor; and at least one storage device storing instructions that when executed by the at least one data processor, cause the system to perform operations that include:

recognizing, by using the at least one data processor, individual animals in images of a plurality of the individual animals;

tracking the individual animals using a probabilistic tracking-by-detection process;

using association vectors generated by a classification network to evaluate a probability that an ear tag belongs to a particular animal in the plurality of the individual animals; and initializing the probability with a uniform probability, wherein for each ear tag and each detected instance of an animal in the plurality of the individual animals, the probability is modified using a weighted summation of an output of the classification network and the uniform probability.

* * * * *